United States Patent
Yamamoto et al.

(10) Patent No.: US 7,959,863 B2
(45) Date of Patent: *Jun. 14, 2011

(54) LIQUID STATE DETECTING SENSOR

(75) Inventors: Takashi Yamamoto, Komaki (JP); Yoshikuni Sato, Komaki (JP); Takeo Sasanuma, Komaki (JP); Akihiro Yoshida, Komaki (JP)

(73) Assignee: NGK Spark Plug Co., Ltd., Aichi (JP)

( * ) Notice: Subject to any disclaimer, the term of this patent is extended or adjusted under 35 U.S.C. 154(b) by 564 days.

This patent is subject to a terminal disclaimer.

(21) Appl. No.: 11/834,887

(22) Filed: Aug. 7, 2007

(65) Prior Publication Data

US 2008/0038153 A1 Feb. 14, 2008

(30) Foreign Application Priority Data

Aug. 9, 2006 (JP) .................................. 2006-217325

(51) Int. Cl.
*G01N 15/06* (2006.01)
*G01N 25/00* (2006.01)
*G01F 23/00* (2006.01)

(52) U.S. Cl. ....................... 422/68.1; 422/82.12; 73/295

(58) Field of Classification Search ................... 422/68.1
See application file for complete search history.

(56) References Cited

U.S. PATENT DOCUMENTS

| 6,214,208 | B1 * | 4/2001 | Ando et al. ................... 205/781 |
| 6,375,828 | B2 * | 4/2002 | Ando et al. ................... 205/781 |
| 7,337,662 | B2 * | 3/2008 | Sato et al. ................... 73/304 C |
| 2005/0285608 | A1 * | 12/2005 | Sato et al. ..................... 324/663 |
| 2007/0006639 | A1 * | 1/2007 | Sasanuma et al. ........... 73/53.01 |
| 2007/0110618 | A1 * | 5/2007 | Sasanuma et al. ........... 422/68.1 |
| 2007/0113625 | A1 * | 5/2007 | Sasanuma et al. ........... 73/61.46 |
| 2008/0173074 | A1 * | 7/2008 | Sasanuma et al. ........... 73/53.01 |
| 2009/0090178 | A1 * | 4/2009 | Sasanuma et al. ............. 73/295 |

FOREIGN PATENT DOCUMENTS

| EP | 1 669 743 A1 | 6/2006 |
| FR | 2 896 587 A1 | 7/2007 |
| WO | 2006-056257 A1 | 6/2006 |

* cited by examiner

*Primary Examiner* — Sam P Siefke
*Assistant Examiner* — Bryan T Kilpatrick
(74) *Attorney, Agent, or Firm* — Sughrue Mion, PLLC

(57) ABSTRACT

A liquid state detecting sensor for detecting a state of a liquid including a liquid concentration detecting element, a holder member, and an enclosing member as defined herein, wherein the holder member has a configuration in which respective portions of a lower end surface facing the enclosed region are located higher than or at a same height as a lowest hole periphery at the rim of the element holding hole from which the detecting element protrudes, and at least one of circulation holes formed in the enclosing member is a bubble-discharging hole which has an upper end located higher than the lowest hole periphery and a lower end located lower than a surface peripheral edge of the lower end surface.

9 Claims, 20 Drawing Sheets

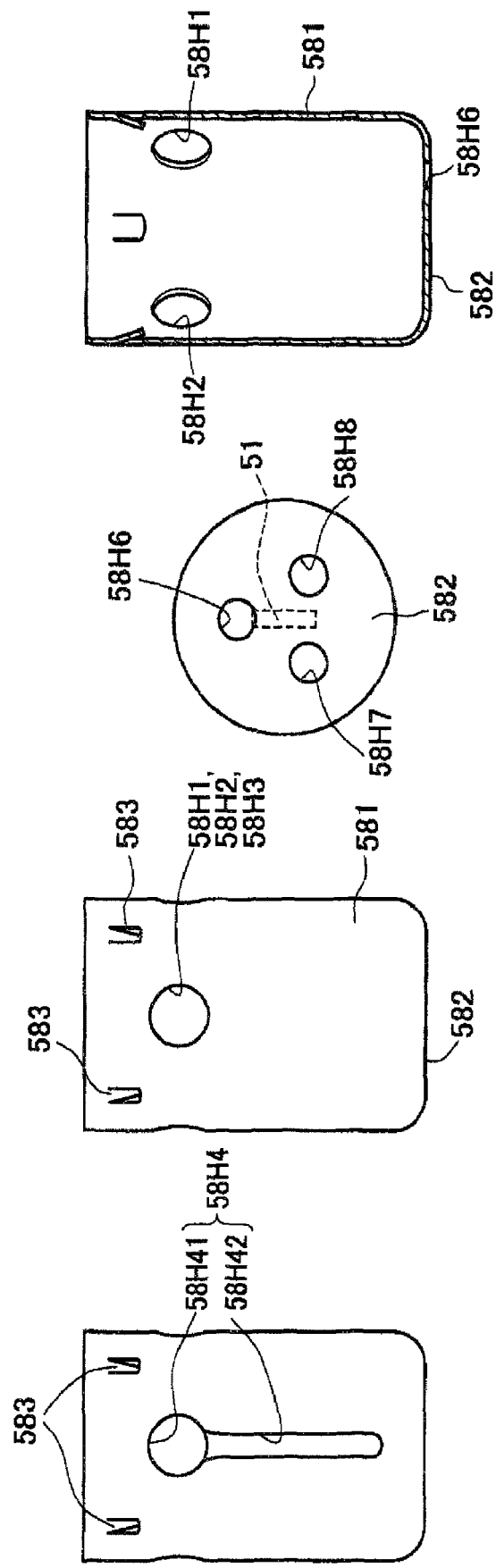

LIQUID STATE DETECTING SENSOR

BACKGROUND OF THE INVENTION

1. Field of the Invention

The present invention relates to a liquid state detecting sensor for detecting the state of a liquid, and more particularly to a liquid state detecting sensor having a liquid concentration detecting element for detecting the concentration of a particular component in a liquid.

2. Description of the Related Art

In recent years, there are cases where an NOx selective reduction catalyst (SCR) system is used in an exhaust gas purifying apparatus for reducing and rendering harmless nitrogen oxides (NOx) emitted from a diesel engine, e.g., a motor automobile with a diesel engine mounted thereon. In this system, a urea aqueous solution is used as a reducing agent, but in order to effectively reduce the nitrogen oxides in this system, the concentration of urea in the urea aqueous solution is necessarily controlled within a prescribed range.

However, even in the case where a urea aqueous solution of the prescribed concentration is accommodated in a urea tank for storing the urea aqueous solution, there are cases where the urea concentration changes over time. In addition, there may be instances where a liquid other than the urea aqueous solution of the proper urea concentration, such as service water, is erroneously poured into the urea tank.

Accordingly, a system has been proposed in which a concentration sensor for monitoring the urea concentration of the urea aqueous solution is installed in the urea tank, and an alarm or the like is issued when an abnormality is detected. As such, the system informs a driver that the reduction (purification) of nitrogen oxides in the exhaust gas purifying apparatus is not being carried out properly (refer to JP-A-2000-371831).

3. Problems to be Solved by the Invention:

Incidentally, in detecting the concentration of a particular component such as urea in a liquid such as a urea aqueous solution using a liquid concentration detecting element, there are cases where bubbles or groups of bubbles (hereafter, these are also collectively referred to as the bubbles) can hinder the measurement. Namely, if the bubbles are in contact with the liquid concentration detecting element when measuring the concentration of a particular component of the liquid, defects result in which, for example, the flow of liquid around the liquid concentration detecting element is hindered and the presence of the bubbles influences the measurement of liquid properties.

On the other hand, there are cases where an enclosing member is provided around that portion of the liquid concentration detecting element which is disposed in the liquid, so as to control the liquid flow and protect the liquid concentration detecting element. In the case where such a construction is provided, if a multiplicity of bubbles accumulate in a region enclosed by the enclosing member, the periphery of that portion of the liquid concentration detecting element which is disposed in the liquid is surrounded by the multiplicity of bubbles. Consequently, it becomes difficult to detect the concentration, and the effect of the bubbles on the concentration measurement is particularly likely to occur.

In addition, there are also cases where an outer enclosing member is further provided around the enclosing member so as to control the liquid flow and protect the liquid concentration detecting element. In the case where the liquid state detecting sensor is thus constructed, it is necessary to give consideration not only to the bubbles which have entered the enclosed region, but also to the bubbles located between the enclosing member and the outer enclosing member.

SUMMARY OF THE INVENTION

The present invention has been made in view of the above-described problems, and an object thereof is to provide a liquid state detecting sensor having a liquid concentration detecting element for detecting the concentration of a particular component in a liquid, which sensor is capable of appropriately discharging bubbles which have entered an enclosed measurement region, to thereby reduce the effect of the bubbles on the concentration measurement.

Another object of the invention is to provide a liquid state detecting sensor having an enclosing member and an outer enclosing member, which sensor is capable of appropriately discharging bubbles which have entered between the enclosing member and the outer enclosing member, to thereby reduce the effect of the bubbles on the concentration measurement.

The above objects have been achieved, in accordance with a first aspect of the invention, by providing a liquid state detecting sensor for detecting a state of a liquid, comprising: a liquid concentration detecting element for detecting a concentration of a particular component of the liquid; a holder member for holding the liquid concentration detecting element in a state in which a distal end portion of the liquid concentration detecting element protrudes from an element holding hole having a hole rim at a lower end of the holding member; and an enclosing member, wherein when the liquid state detecting sensor is set such that a protruding direction of the distal end portion of the liquid concentration detecting element coincides with a gravitational direction, the enclosing member encloses at least a periphery in a horizontal direction of the distal end portion of the liquid concentration detecting element to leave an interval with the distal end portion, at least one of circulation holes being formed in the enclosing member so as to allow the liquid to circulate in and out of an enclosed region enclosed by the enclosing member, the holder member is configured such that respective portions of a lower end surface facing the enclosed region are located higher than or at a same height as a lowest hole periphery at the rim of the element holding hole from which the detecting element protrudes, and at least one of the circulation holes is a bubble-discharging hole which has an upper end located higher than the lowest hole periphery from which the detecting element protrudes and a lower end located lower than a surface peripheral edge of the lower end surface.

The liquid state detecting sensor in accordance with the above-described aspect of the invention has bubble-discharging holes individually having an upper end located higher than the lowest hole periphery of the element holding hole and a lower end located lower than the surface peripheral edge of the lower end surface. For this reason, even if bubbles in the liquid enter the interior of the enclosed region, the bubbles are discharged outside the enclosed region through the bubble-discharging holes, and the bubbles are not accumulated below the height in the vicinity of the upper ends of the bubble-discharging holes. Accordingly, it is possible to prevent a defect in which a multiplicity of bubbles are accumulated within the enclosed region (within the enclosing member), and the bubbles come into contact with the distal end portion of the liquid concentration detecting element or hinder circulation of the liquid within the enclosed region to thereby interfere with detection of the concentration of a particular component of the liquid.

The liquid state detecting sensor may be a sensor which detects at least the concentration of a particular component of a liquid among the states of a liquid, and the liquid state detecting sensor may be a combination type sensor which is capable of detecting, in addition to concentration of a particular component, the temperature of the liquid and the level of the liquid in combination.

In addition, the liquid concentration detecting element may be so constructed as to detect the concentration of a particular component of a liquid, and the liquid concentration detecting element may be a combination type element which is capable of detecting, in addition to the concentration of a particular component, the temperature of a liquid and whether or not the level of the liquid has dropped below a lower limit level.

In addition, the enclosing member may enclose at least the periphery in the horizontal direction of the distal end portion of the liquid concentration detecting element to leave an interval with the distal end portion, but may be adapted to also enclose a lower side below the distal end portion.

Further, the holder member may be configured such that every portion of its lower end surface facing the enclosed region is located higher than the lowest hole periphery or at the same height as the lowest hole periphery of the element holding hole. Specifically, it is possible to employ a form in which the entire lower end surface of the holder member is located at the same height as the lowest hole periphery, i.e., a configuration in which the entire lower end surface forms a horizontal surface including the hole rim of the element holding hole. In addition, it is also possible to employ a tapered shape such as a conical shape in which the lower end surface becomes gradually higher from the element holding hole toward the surface peripheral edge, or a stepped tapered shape in which the lower end surface from the element holding hole to a midway point en route to the surface peripheral edge is formed as a horizontal surface, and wherein the lower end surface becomes gradually higher from the midway point toward the surface peripheral edge. Furthermore, it is also possible to employ a multi-stage shape such as a two-stage shape in which the lower end surface from the element holding hole to a midway point en route to the surface peripheral edge is formed as a first horizontal surface, and a stepped portion is provided at the midway point to form anew a second horizontal surface higher than the first horizontal surface up to the surface peripheral edge.

In addition, in the above-described liquid state detecting sensor in accordance with a second aspect of the invention, the holder member may be configured such that, in respective portions of the lower end surface, when a comparison is made of the respective portions, a portion on a side closer to a surface peripheral edge of the lower end surface is located higher or at the same height, and an upper end of the bubble-discharging hole is located higher than the surface peripheral edge of the lower end surface.

In the liquid state detecting sensor in accordance with the above-described aspect of the invention, the holder member is configured such that, in the respective portions of the lower end surface, when a comparison is made of the respective portions, a portion on a side closer to the surface peripheral edge of the lower end surface is located higher or at the same height. Namely, the form provided is such that, if the lower end surface is viewed along a route from the hole rim of the element holding hole to the surface peripheral edge of the lower end surface, any one of a horizontal portion, a gradually higher portion, or a suddenly higher portion appears. Moreover, the bubble-discharging holes have their upper ends higher than the surface peripheral edge of the lower end surface. It should be noted that the lower ends of the bubble-discharging holes are lower than the surface peripheral edge of the lower end surface.

Accordingly, in this liquid state detecting sensor, the bubbles which have entered the enclosed region can move smoothly along the lower end surface of the holder member toward the surface peripheral edge of the lower end surface and can be discharged outside the enclosing member through the bubble-discharging holes.

The holder member may be configured such that, in the respective portions of the lower end surface, when a comparison is made of the respective portions, a portion closer to the surface peripheral edge of the lower end surface is located higher or at the same height. Specifically, it is possible to employ a form in which the entire lower end surface forms a horizontal surface including the hole rim of the element holding hole. In addition, it is also possible to employ a tapered shape such as a conical shape in which the lower end surface becomes gradually higher from the element holding hole toward the surface peripheral edge, or a stepped tapered shape in which the lower end surface from the element holding hole to a midway point en route to the surface peripheral edge is formed as a horizontal surface, and the lower end surface becomes gradually higher from the midway point toward the surface peripheral edge. Furthermore, it is also possible to employ a form of a multi-stage shape such as a two-stage shape in which the lower end surface from the element holding hole to a midway point en route to the surface peripheral edge is formed as a first horizontal surface, and a stepped portion is provided at the midway point to form anew a second horizontal surface higher than the first horizontal surface up to the surface peripheral edge.

Furthermore, in the liquid state detecting sensor in accordance with a third aspect of the invention, the holder member may have a lower end surface formed by an element surrounding surface around the element holding hole and by a peripheral side surface which is located on a side closer to the surface peripheral edge of the lower end surface than the element surrounding surface, the element surrounding surface including the surface peripheral edge of the lower end surface and being higher than the element surrounding surface.

In the liquid state detecting sensor in accordance with the above-described aspect of the invention, the holder member has the lower end surface formed by an element surrounding surface and a peripheral side surface which is higher than the same. In other words, the peripheral side surface higher than the element surrounding surface, i.e., a "pocket," is formed on the surface peripheral edge side away from the element surrounding surface, so that once bubbles move to the peripheral side surface side, the bubbles are unlikely to return to the element surrounding surface side. Accordingly, the bubbles which have entered the enclosed region can reliably move toward the surface peripheral edge of the lower end surface and can be discharged outside the enclosing member through the bubble-discharging holes. As such, the effect of bubbles on the concentration detection by the liquid concentration detecting element can thus be suppressed further.

Alternatively, in the above-described liquid state detecting sensor in accordance with a fourth aspect of the invention, the holder member may be configured such that the lower end surface becomes gradually higher from the hole rim of the element holding hole toward the surface peripheral edge of the lower end surface.

In the liquid state detecting sensor in accordance with the above-described aspect of the invention, the holder member is configured such that the lower end surface becomes gradually higher from the hole rim of the element holding hole toward the surface peripheral edge of the lower end surface. In other words, the form of the holder member is such that if the lower end surface is viewed along the route from the hole rim of the element holding hole to the surface peripheral edge of the lower end surface, either one of a portion which becomes gradually higher and a portion which becomes higher in a step form appears.

Accordingly in this liquid state detecting sensor, once the bubbles move to the surface peripheral edge side of the lower end surface, the bubbles are unlikely to return to the element holding hole side. Accordingly, the bubbles which have entered the enclosed region can reliably move more smoothly along the lower end surface toward the surface peripheral edge of the lower end surface and can be discharged outside the enclosing member through the bubble-discharging holes. As such, the effect of bubbles on the concentration detection by the liquid concentration detecting element can thus be suppressed further.

Furthermore, in accordance with a fifth aspect of the invention, in the liquid state detecting sensor according to any one of the above-described aspects, the distal end portion of the liquid concentration detecting element may include: a main surface; and a reverse surface located on a reverse side of the main surface, the distal end portion including a temperature rise detecting portion which increases in temperature upon energization, included in the temperature rise detecting portion is set as a temperature-rise-portion main surface, and a portion of the reverse surface included in the temperature rise detecting portion is set as a temperature-rise-portion reverse surface, the enclosing member is configured such that the circulation holes including the bubble-discharging holes are individually arranged so as not to frontally face the temperature-rise-portion main surface or the temperature-rise-portion reverse surface of the distal end portion of the liquid concentration detecting element.

In a case where liquid currents in various directions have been established in the liquid, if any one of the circulation holes of the enclosing member frontally faces the temperature-rise-portion main surface or the temperature-rise-portion reverse surface of the temperature rise detecting portion of the liquid concentration detecting element, the liquid current which has flowed in through this frontally facing circulation hole advances in such manner so as to collide against the temperature-rise-portion main surface or the temperature-rise-portion reverse surface of the temperature rise detecting portion. Therefore, a large effect is likely to be produced, such as interference with the temperature rise of the temperature rise detecting portion due to the liquid current.

By contrast, in the sensor in accordance with the invention, the respective circulation holes of the enclosing member are arranged at positions where they do not frontally face the temperature-rise-portion main surface or the temperature-rise-portion reverse surface of the distal end portion. For example, the respective circulation holes are arranged outside a virtual main-surface projected region or reverse-surface projected region in which the temperature-rise-portion main surface or the temperature-rise-portion reverse surface of the distal end portion is projected in its thicknesswise direction. For this reason, the occurrence of a liquid current advancing in such manner so as to collide against the main surface or the reverse surface of the distal end portion is prevented Consequently, it is possible to reduce the effect of the liquid current such as interference with the temperature rise of the temperature rise detecting portion. Hence, it is possible to more accurately detect the concentration of a particular component of the liquid.

Furthermore, in accordance with a sixth aspect of the invention, the liquid state detecting sensor according to any one of the above-described aspects may further comprise: an outer enclosing member enclosing the periphery in the horizontal direction of the distal end portion of the liquid concentration detecting element and a periphery in the horizontal direction of the enclosing member to leave an interval with the enclosing member; and an interposed member interposed between the enclosing member and the outer enclosing member, the outer enclosing member having at least one of outer circulation holes so as to allow the urea aqueous solution to circulate in the horizontal direction, between a region outside the outer enclosing member and an outer enclosed region defined by the outer enclosing member and the enclosing member, the interposed member including an interposed member lower surface located higher than the outer enclosed region and facing the outer enclosed region, at least one of the outer circulation holes is a outer bubble-discharging hole which has an upper end located higher than the upper end of the bubble-discharging hole, and the interposed member lower surface is configured such that, in an inner peripheral portion of the interposed member lower surface, at least each of discharge-hole corresponding portions located outwardly of the bubble-discharging holes in the horizontal direction is set higher than the upper end of a corresponding one of the bubble-discharging holes, while, in an outer peripheral portion of the interposed member lower surface, at least each of outer-discharge-hole corresponding portions located inwardly of the outer bubble-discharging hole in the horizontal direction is set higher than a lower end of a corresponding one of the outer bubble-discharging holes, and is configured such that at least a portion of bubble groups which have entered an interior of the enclosed region and have been discharged through the bubble-discharging holes is capable of moving from the discharge-hole corresponding portion to the outer-discharge-hole corresponding portion along the portion of the interposed member lower surface which is higher than the upper end of the bubble-discharging hole corresponding to the discharge-hole corresponding portion.

In the liquid state detecting sensor in accordance with the above-described aspect of the invention, in the interposed member lower surface of the interposed member, any one of the discharge-hole corresponding portions is set higher than the upper end of the bubble-discharging hole corresponding to the discharge-hole corresponding portion. A case is considered in which this sensor is used in the detection of a state of a liquid, specifically a case in which the distal end portion of the liquid concentration detecting element, the enclosing member, the outer enclosing member, and the interposed member are immersed in a liquid at an attitude in which the protruding direction of the distal end portion of the liquid concentration detecting element is set to the gravitational direction. In this case, the bubbles (bubble groups) can be easily discharged when discharging to the outer enclosed region through the bubble-discharging holes.

In addition, at least one of the outer circulation holes is a outer bubble-discharging hole whose upper end is higher than the upper end of the bubble-discharging hole. Further, any one of the outer-discharge-hole corresponding portions of the interposed member lower surface of the interposed member is set higher than the lower end of the outer bubble-discharging hole corresponding to the discharge-hole corresponding portion. For this reason, the bubbles which have reached the outer-discharge-hole corresponding portion can be discharged outside the outer enclosing member through the outer bubble-discharging hole corresponding to the outerdischarge-hole corresponding portion without flowing backward to the bubble-discharging hole side of the enclosing member.

Moreover, the interposed member lower surface of the interposed member is configured such that at least a portion of the bubble groups is capable of being moved from the discharge-hole corresponding portion to the outer-discharge-hole corresponding portion along the portion of the interposed member lower surface which is higher than the upper end of the bubble-discharging hole corresponding to the discharge-hole corresponding portion. Therefore, the bubbles (bubble groups) discharged from the interior of the enclosing member to the outer enclosed region (discharge-hole corresponding portion of the interposed member lower surface) through the bubble-discharging hole can be moved to the outer-discharge-hole corresponding portion of the interposed member lower surface without flowing backward into the enclosed region. The bubbles (bubble groups) can be subsequently discharged through the outer bubble-discharging hole, as described above.

Thus, in the invention, even in a case where the outer enclosing member is provided in addition to the enclosing member, the bubbles (bubble groups) which have entered the interior of the enclosing member can be discharged outside the enclosing member (outer enclosed region) and further outside the outer enclosing member, so that the effect of the bubbles on concentration detection and the like can be reduced.

It should be noted that the bubbles which have directly entered the outer enclosed region can similarly be discharged outside the outer enclosing member from the outer-discharge-hole corresponding portion of the interposed member lower surface of the interposed member through the outer bubble-discharging hole. Moreover, it is also possible to prevent the bubbles from conversely entering the enclosed region through the bubble-discharging hole.

The outer enclosing member may enclose the distal end portion of the liquid concentration detecting element and at least the horizontal periphery of the enclosing member to leave an interval with the enclosing member, but may be provided with a form in which the outer enclosing member further encloses the distal end portion of the liquid concentration detecting element and the enclosing member from below.

In addition, the interposed member is a member which is interposed between the enclosing member and the outer enclosing member, and may be made up of a plurality of members.

The interposed member lower surface of this interposed member is configured such that at least a portion of bubble groups which have entered an interior of the enclosed region and have been discharged through the bubble-discharging holes is capable of being moved from the discharge-hole corresponding portion to the outer-discharge-hole corresponding portion along the portion of the interposed member lower surface which is higher than the upper end of the bubble-discharging hole corresponding to the discharge-hole corresponding portion.

A specific form of such an interposed member lower surface may be, for instance, a form in which the overall interposed member lower surface, including the discharge-hole corresponding portions and the outer-discharge-hole corresponding portions, is located at the same height, i.e., a form in which the overall interposed member lower surface forms a horizontal surface, including the discharge-hole corresponding portions and the outer-discharge-hole corresponding portions. In this case, the overall interposed member lower surface, including the outer discharge-hole corresponding portions, is set higher than the upper ends of the bubble-discharging holes, and the overall interposed member lower surface, including the outer-discharge-hole corresponding portions, is set lower than the lower ends of the outer bubble-discharging holes. In addition, it is also possible to employ a tapered shape for forming a conical shape and the like in which the interposed member lower surface becomes gradually higher from its inner peripheral edge toward an outer peripheral edge, or a stepped tapered shape for forming a conical surface in which the interposed member lower surface from its inner peripheral edge to a midway point en route to its outer peripheral edge is formed as a horizontal surface, and the interposed member lower surface becomes gradually higher from the midway point toward the outer peripheral edge. Furthermore, it is also possible to employ a multi-stage shape such as a two-stage shape in which the interposed member lower surface from the its inner peripheral edge to a midway point en route to its outer peripheral edge is formed as a first horizontal surface, and a stepped portion is provided at the midway point to form anew a second horizontal surface higher than the first horizontal surface up to the outer peripheral edge. In the above-described three examples, certain forms have been illustrated in which the overall interposed member lower surface is formed into a tapered shape, a stepped tapered shape, or a multi-stage shape, and the overall outer peripheral portion of the interposed member lower surface is set higher than the inner peripheral portion. Additionally, however, it is also possible to employ a form in which portions of the outer peripheral portion, such as only the outer-discharge-hole corresponding portions or the outer-discharge-hole corresponding portions and their peripheral portions, have a tapered form (conical surface) or stepped form so as to be set higher than the remaining portions. In addition, it is also possible to employ a grooved form in which routes (grooves) for the movement of the bubbles for reaching the outer-discharge-hole corresponding portions from the discharge-hole corresponding portions are set higher than both banks along these routes.

As described above, the interposed member lower surface is configured such that at least a portion of bubble groups is capable of being moved from the discharge-hole corresponding portion to the outer-discharge-hole corresponding portion along the portion of the interposed member lower surface which is higher than the upper end of the bubble-discharging hole corresponding to the discharge-hole corresponding portion. Accordingly, a portion of the interposed member lower surface may be lower than the upper end of the bubble-discharging hole.

Furthermore, in the liquid state detecting sensor in accordance with a seventh aspect of the invention, respective portions of the interposed member lower surface of the interposed member may be set higher than the upper ends of the bubble-discharging holes.

In the liquid state detecting sensor in accordance with the above-described aspect of the invention, the overall interposed member lower surface is set higher than the upper ends of the bubble-discharging holes. For this reason, the bubbles (bubble groups) discharged from the bubble-discharging holes can be temporarily held in the entire upper portion of the outer enclosed region in such manner as to be in contact with the interposed member lower surface. Therefore, the bubbles can be reliably discharged through the bubble-discharging holes while preventing the bubbles from flowing backward into the enclosing member through the bubble-discharging holes.

Furthermore, in accordance with an eighth aspect of the invention, in the liquid state detecting sensor according to any one of the above-described aspects, in the interposed member lower surface of the interposed member, at least the outer-discharge-hole corresponding portions of an outer peripheral portion of the interposed member lower surface are respectively set higher than the inner peripheral portion.

In the liquid state detecting sensor in accordance with the above-described aspect of the invention, since at least the outer-discharge-hole corresponding portions of the outer peripheral portion of the interposed member lower surface are respectively set higher than the inner peripheral portion, the bubbles (bubble groups) which once reached the vicinities of the outer-discharge-hole corresponding portions are unlikely to return to the inner peripheral portion on the lower side and further to the interior of the enclosing member. As such, since the bubbles in the vicinities of the outer-discharge-hole corresponding portions can be further reliably discharged outside the outer enclosing member through the outer bubble-discharging holes, the effect of bubbles on the concentration detection and the like can be reliably suppressed.

The interposed member lower surface may be such that at least the outer-discharge-hole corresponding portions of its outer peripheral portion are respectively set higher than its inner peripheral portion. Accordingly, it is possible to employ a form in which, in the outer peripheral portion, only the outer-discharge-hole corresponding portions or the outer-discharge-hole corresponding portions and their peripheral portions are formed into a tapered form or a stepped form so as to be set higher than the remaining portions. Additionally, it is also possible to adopt a form in which the overall outer peripheral portion of the interposed member lower surface is set higher than the inner peripheral portion by, for example, forming the overall interposed member lower surface into a tapered form, a stepped tapered form, or a multi-stage shape.

BRIEF DESCRIPTION OF THE DRAWINGS

FIGS. 5A and 5B are explanatory diagrams illustrating the positional relationship among a concentration sensor element, a holder member, and the protector, in which FIG. 5A is a partially enlarged view of the longitudinal cross-sectional view shown in FIG. 3, and FIG. 5B is a partially enlarged view of the longitudinal cross-sectional view shown in FIG. 4;

FIGS. 7A to 7D are diagrams illustrating the shape of the protector, in which FIG. 7A is a front elevational view, FIG. 7B is a side elevational view, FIG. 7C is a bottom view, and FIG. 7D is a longitudinal cross-sectional view;

FIGS. 8A to 8C are diagrams illustrating the shape of the holder member, in which FIG. 8A is a front elevational view, FIG. 8B is a side elevational view, and FIG. 8C is a longitudinal cross-sectional view;

FIGS. 19A to 19D are diagrams illustrating the shape of the rubber bushing, in which FIG. 19A is a front elevational view (side elevational view), FIG. 19B is a plan view, FIG. 19C is a longitudinal cross-sectional view, and FIG. 19D is a bottom view;

FIGS. 21A to 21D are diagrams illustrating the positioning member and the rectifying member, in which FIG. 21A is a front elevational view (side elevational view), FIG. 21B is a plan view, FIG. 21C is a longitudinal cross-sectional view, and FIG. 21D is a bottom view.

DESCRIPTION OF REFERENCE NUMERALS

Figure 1:
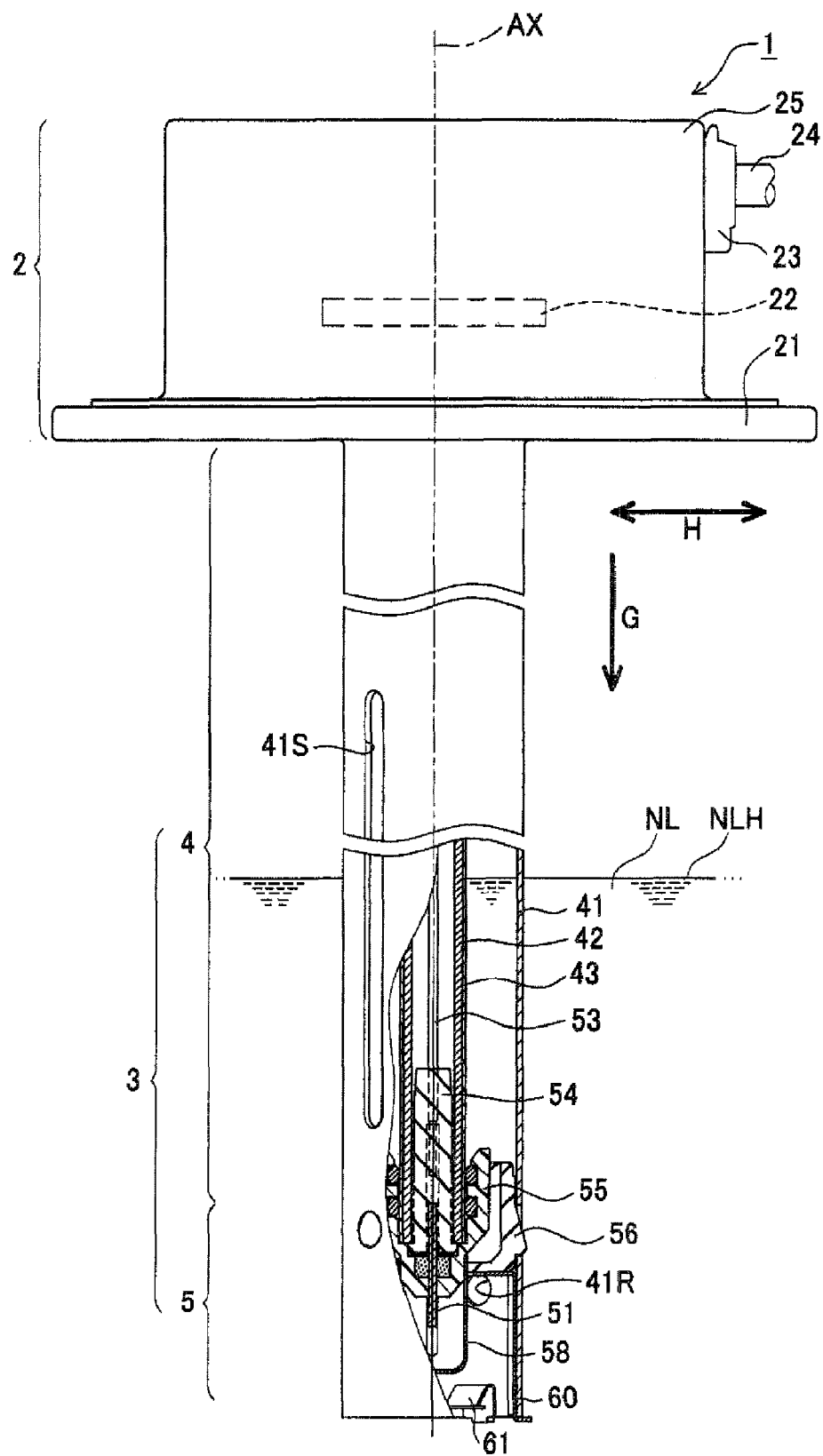
FIG. 1 is a fragmentary cross-sectional view of a liquid state detecting sensor in accordance with a first embodiment.

Reference numerals used to identify various structural features in the drawings include the following.
1, 1001, 2001: liquid state detecting sensor
AX: axis (of the liquid state detecting sensor)
2, 2002: proximal portion
3, 2003: sensor portion
4: liquid level sensor portion
41: outer cylinder (outer enclosing member)
41R: circulation hole (outer circulation hole, outer bubble-discharging hole)
41RK: proximal end (upper end) of the circulation hole
41RS: distal end (lower end) of the circulation hole
411: distal end portion
42: inner cylinder (holding tube)

421: distal end portion (of the inner cylinder)
5, 2005: liquid concentration sensor portion
51: concentration sensor element
510: temperature rise detecting portion
511: distal end portion
511A: main surface (of the distal end portion)
511B: reverse surface (of the distal end portion)
511AS: temperature-rise-portion main surface (included in the temperature rise detecting portion in the main surface)
511BS: temperature-rise-portion reverse surface (included in the temperature rise detecting portion in the reverse surface)
518: internal heater wiring
55, 155, 255: holder member
55H: holder through hole
55H1: inner cylinder holding hole
55H1A: inner cylinder spacedly-opposing surface
55H1B, 55H1C: inner cylinder closely-opposing surface
55H1T: liquid introducing tapered surface
55G1, 55G2: O-ring insertion groove
55H4: 155H4, 255H4: element holding hole
55H4F, 155H4F, 255H4F: hole rim (lowest hole periphery of the element holding hole)
55D: inner cylinder abutment surface 55D
554, 1554, 2554: tapered distal end portion
554T, 1554T, 2554T: outer peripheral surface (of the tapered distal end portion) (lower end surface, peripheral side surface)
554K, 1554K, 2554K: proximal edge (of the outer peripheral surface) (surface peripheral edge of the lower end surface)
554J: distal edge
554S, 2554S: distal end surface (of the tapered distal end portion) (lower end surface, element surrounding surface)
56, 256: rubber bushing (interposed member)
56H, 256H: holder holding hole
56S, 256S: distal end surface (interposed member lower surface)
256S1: distal end flat surface
256S2: distal inclined flat surface
561, 2561: bushing body portion
2563: notched portion
571, 572: O-ring
58, 258: protector (inner enclosing member)
581, 2581: leg portion
582, 2582: bottom portion
58H1, 58H2, 58H3, 58H4: liquid circulation hole (inner bubble-discharging hole)
258H1: upper liquid circulation hole (inner bubble-discharging hole)
258H2: lower liquid circulation hole
58H41: circular hole portion
58H42: slit portion
58H1K, 58H2K, 58H3K, 58H4K: proximal end (upper end of the liquid circulation hole)
58H1S, 58H2S, 58H3S, 58H4S: distal end (lower end of the liquid circulation hole)
258H1K: proximal end (upper end of the upper liquid circulation hole)
258H1S: distal end (lower end of the upper liquid circulation hole)
58H6, 58H7, 58H8, 258H6: lower circulation hole
EH: enclosed region
60, 260: positioning member (interposed member)
601, 2601: positioning plate portion
601H, 2601H: insertion hole
601S, 2601S: distal end surface (interposed member lower surface)
2601C: notched portion (of the positioning plate portion)
602, 2602: leg portion
602K, 2602K: engaging pawl portion
61, 261: rectifying member
611, 2611: rectifying plate portion]
612, 2612: leg portion
612K, 2612K: engaging pawl portion
G: gravitational direction
H: horizontal direction
FH: outer enclosed region
KS, KS2: interposed member lower surface
KSI, KSI2: inner peripheral portion (of the interposed member lower surface)
KSIC, KSIC2: discharge-hole corresponding portion (of the interposed member lower surface)
KSO, KSO2: outer peripheral portion (of the interposed member lower surface)
KSOC, KSOC2: outer-discharge-hole corresponding portion (of the interposed member lower surface)
BB: bubble
NL: urea aqueous solution (liquid)

DETAILED DESCRIPTION OF THE INVENTION

First Embodiment

Referring to FIGS. 1 to 11, a description will be given of an embodiment of a liquid state detecting sensor in accordance with the invention. However, the present invention should not be construed as being limited thereto.

A liquid state detecting sensor 1 (hereafter also referred to as the sensor) in accordance with the first embodiment is used as a device for detecting the concentration of an urea aqueous solution NL accommodated in an accommodation tank and for detecting the liquid level NLH of the urea aqueous solution NL in an exhaust gas purifying apparatus for reducing and rendering harmless nitrogen oxides (NOx) emitted from a diesel engine, e.g., a motor automobile with a diesel engine mounted thereon, by the urea aqueous solution NL.

This liquid state detecting sensor 1 is comprised of a proximal portion 2 and a sensor portion 3 extending downward in FIG. 1 from the proximal portion 2. The liquid state detecting sensor 1 is used by mounting the proximal portion 2 around an opening of an accommodation tank (not shown) in which the urea aqueous solution NL is accommodated, by setting the sensor portion 3 in an attitude so as to extend in a gravitational direction G, and by immersing the sensor portion 3 in the urea aqueous solution NL.

Accordingly, as used herein, in describing the sensor 1 and its respective parts, a description will be given by setting the upper side in FIG. 1 as a proximal end side and the lower side as a distal end side in the direction (axial direction) along an axis AX shown in FIG. 1.

In addition, in cases where portions related to the attitude of the sensor 1 and the gravitational direction G are specified or described, a description will be given on the basis of an attitude in which the direction of the sensor portion 3 extending relative to the proximal portion 2 (a downward direction in the direction (axial direction) along the axis AX shown in FIG. 1) is set as the gravitational direction G. Accordingly, a description will be given by assuming that, for instance, the sensor portion 3 is located on the lower position side (lower side) as compared to the proximal portion 2, and that the proximal portion 2 is conversely located on the side in the opposite direction to the gravitational direction G, i.e., on the higher position side (upper side) as compared to the sensor portion 3.

In the liquid state detecting sensor 1, the proximal portion 2 has a mounting flange 21 and a cap 25 enclosing a wiring board 22, an external connection cable 24, and a bushing 23 for holding the cable and the like. In addition, the sensor portion 3 consists of a double cylindrical liquid level sensor portion 4 and a liquid concentration sensor portion 5 which is located closer to the distal end side than the same and which is positioned on the lower side when in use.

First, a description will be given of the proximal portion 2. The mounting flange 21 is formed of a metal and is used as a seat for mounting the liquid state detecting sensor 1 on a rim of the opening of the accommodating tank (not shown). An unillustrated bolt insertion hole is formed in this mounting flange 21, so that the liquid state detecting sensor 1 (proximal portion 2) can be fixed to the accommodation tank.

Meanwhile, the wiring board 22 indicated by the broken line in FIG. 1 is disposed at a position higher than the mounting flange 21. A control circuit having a CPU, electronic circuits, and the like formed on this wiring board 22 is electrically connected to the liquid level sensor portion 4 and the liquid concentration sensor portion 5, and is connectable to an external electric circuit through the external connection cable 24. In addition, the wiring board 22 is covered by a cap 25 fitted to the mounting flange 21 and is liquid-tightly protected.

Figure 6A:
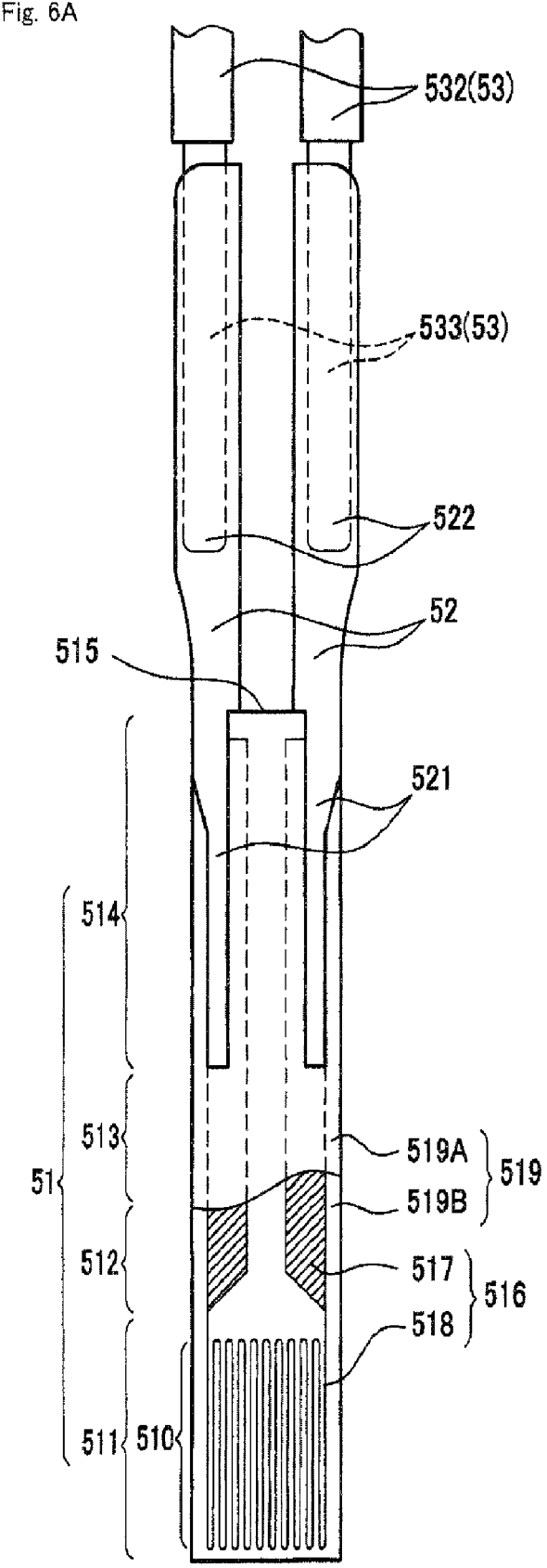
FIG. 6A is an explanatory diagram illustrating forms and connection forms of the concentration sensor element, connection terminals, and lead wires.
Figure 6B:
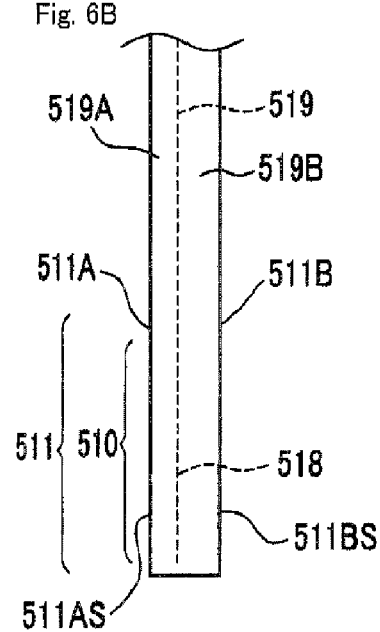
FIG. 6B is a side elevational view of a distal end portion of the concentration sensor element.

Through the energization of a concentration sensor element 51, shown in FIGS. 6A and 6B, of the liquid concentration sensor portion 5, the control circuit formed on the wiring board 22 detects the concentration of the urea aqueous solution NL on the basis of an output signal corresponding to a resistance value of an internal heater wiring 518, specifically on the basis of a potential difference (voltage value) occurring across both ends of the internal heater wiring 518 as a predetermined current is passed through the concentration sensor element 51.

Next, a description will be given of the sensor portion 3. As described above, this sensor portion 3 consists of the liquid level sensor portion 4 and the liquid concentration sensor portion 5. Of these, the liquid level sensor portion 4 will be described first, and the liquid concentration sensor portion 5 will be described later.

As shown in FIG. 1, the liquid level sensor portion 4 includes an outer cylinder 41 of a hollow cylindrical shape extending in the direction (axial direction) along the axis AX, as well as an inner cylinder 42 of a hollow cylindrical shape which is disposed in its interior. The inner cylinder 42 is concentric with this outer cylinder 41, and has a relatively smaller diameter. The inner peripheral surface of the outer cylinder 41 and the outer peripheral surface of the inner cylinder 42 are spaced apart from one another with a predetermined interval therebetween.

Of these, the outer cylinder 41 is formed of a metal and serves as one electrode for detecting the liquid level. Additionally, the outer cylinder 41 has a narrow elongated elliptical slit 41S whose longitudinal direction is the direction of the axis AX. Consequently, the outer cylinder 41 in communication with the outside is capable of accommodating the urea aqueous solution NL in the space between the outer cylinder 41 and the inner cylinder 42. In addition, a distal end 41T (lower end in FIG. 1, see FIG. 3) of the outer cylinder 41 is open, while its proximal end (upper end in the drawing) is secured to the mounting flange 21 by welding or the like.

In the sensor 1 of the first embodiment, the outer cylinder 41 is welded to the mounting flange 21. Further, this mounting flange 21 is connected to the ground potential in the control circuit formed on the wiring board 22, thereby setting the outer cylinder 41 at ground potential.

In addition, a rubber bushing 56, which will be described below, is interposed between a distal end portion 411 of the outer cylinder 41 located on the distal end side and a distal end portion 421 of the inner cylinder 42 located on the distal end side. Holding holes 41H for holding the rubber bushing 56 (liquid concentration sensor portion 5) by respectively engaging retaining projecting portions 562 of this rubber bushing 56 are formed in the distal end portion 411 of the outer cylinder 41 at a plurality of predetermined circumferential positions (at three positions in the first embodiment, see FIGS. 1 and 3). Further, three circulation holes 41R for ensuring circulation of the urea aqueous solution NL with the interior of the outer cylinder 41 are bored in the distal end portion 411 of the outer cylinder 41 on a side closer to the distal end than the holding holes 41H.

In addition, the inner cylinder 42 is also formed of a metal and serves as the other electrode for measuring the liquid level. The inner cylinder 42 is electrically connected to the control circuit on the wiring board 22 so as to oppose the outer cylinder 41 while being electrically insulated from the outer cylinder 41. The outer peripheral surface 42G of the inner cylinder 42 is clad with an insulating film 43 formed of a fluorocarbon resin such as PTFE, PFA, and ETFE, an epoxy resin, a polyimide resin, or the like, so that the inner cylinder 42 is electrically insulated from the outer cylinder 41 even in the presence of the urea aqueous solution NL (liquid to be measured) between the inner cylinder 42 and the outer cylinder 41.

To detect the liquid level NLH of the urea aqueous solution NL the liquid level sensor portion 4 is immersed in the urea aqueous solution NL, and the urea aqueous solution NL is allowed to flow into the space between the outer cylinder 41 and the inner cylinder 42 (insulating film 43) through the slit 41S.

Then, in the liquid level sensor portion 4, a portion where the urea aqueous solution NL is present and a portion where it is absent are formed between the outer cylinder 41 and the inner cylinder 42 in correspondence with the liquid level NLH, so that the electrostatic capacity of a capacitor formed between the outer cylinder 41 and the inner cylinder 42 changes in correspondence with the liquid level NLH. Accordingly, if an AC voltage is applied across the outer cylinder 41 and the inner cylinder 42, an electric current corresponding to the magnitude of the electrostatic capacity flows, so that the liquid level NLH of the urea aqueous solution NL is detected by ascertaining the magnitude of the electric current.

Next, a description will be given of the liquid concentration sensor portion 5.

Figure 2:
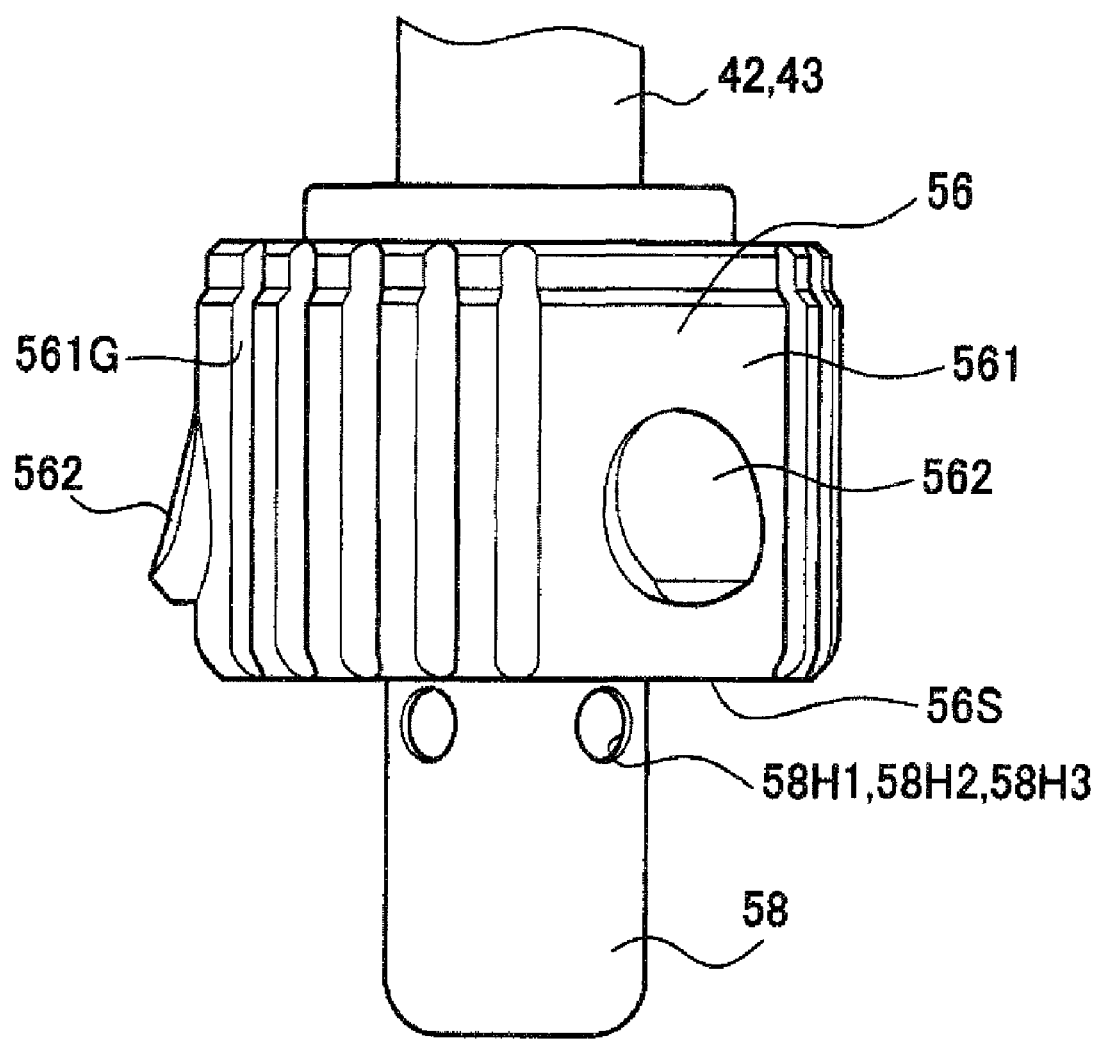
FIG. 2 is a diagram illustrating a rubber bushing and a protector in a liquid concentration sensor portion of the liquid state detecting sensor.
Figure 3:
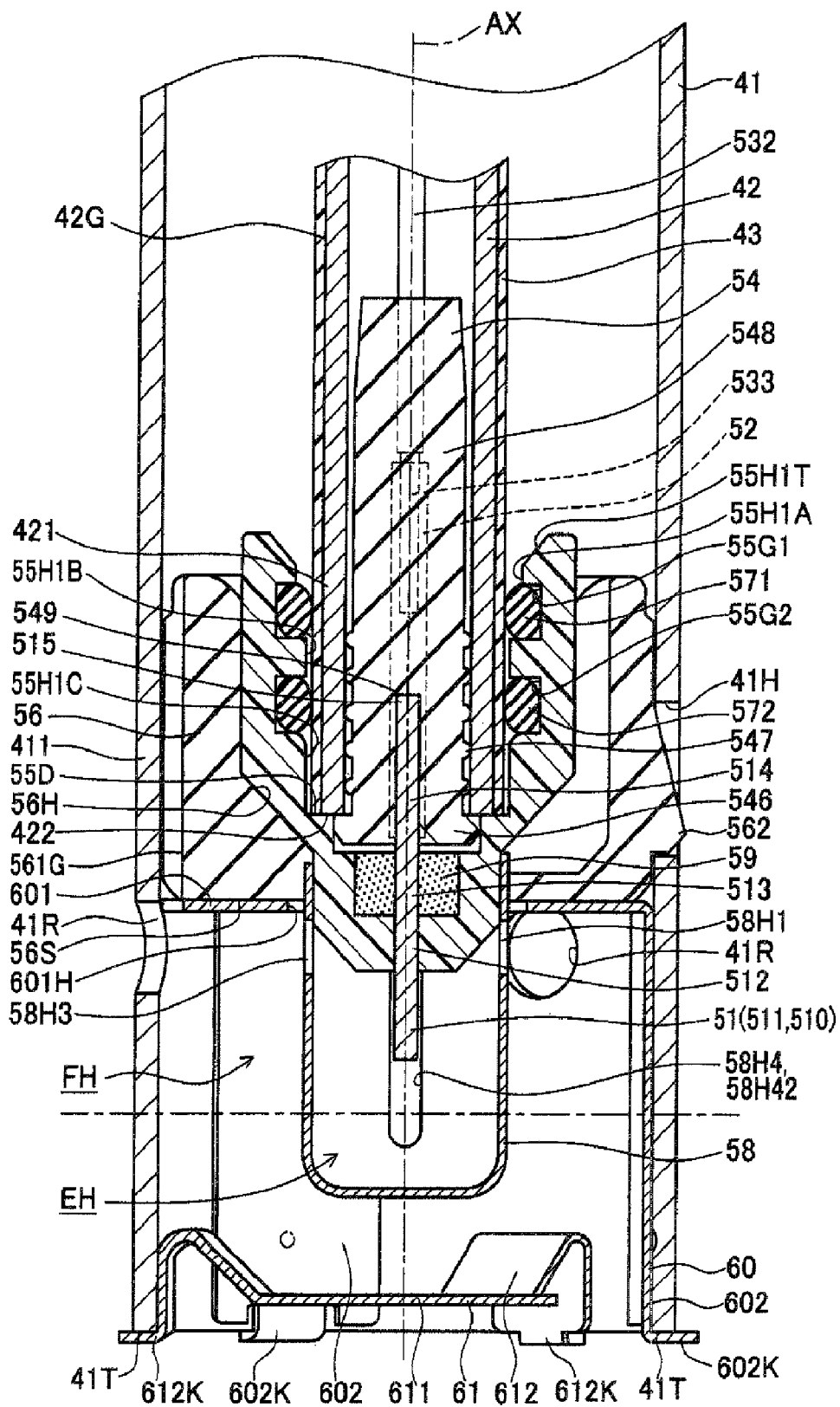
FIG. 3 is a longitudinal cross-sectional view of the liquid concentration sensor portion in the liquid state detecting sensor in accordance with the first embodiment.
Figure 4:
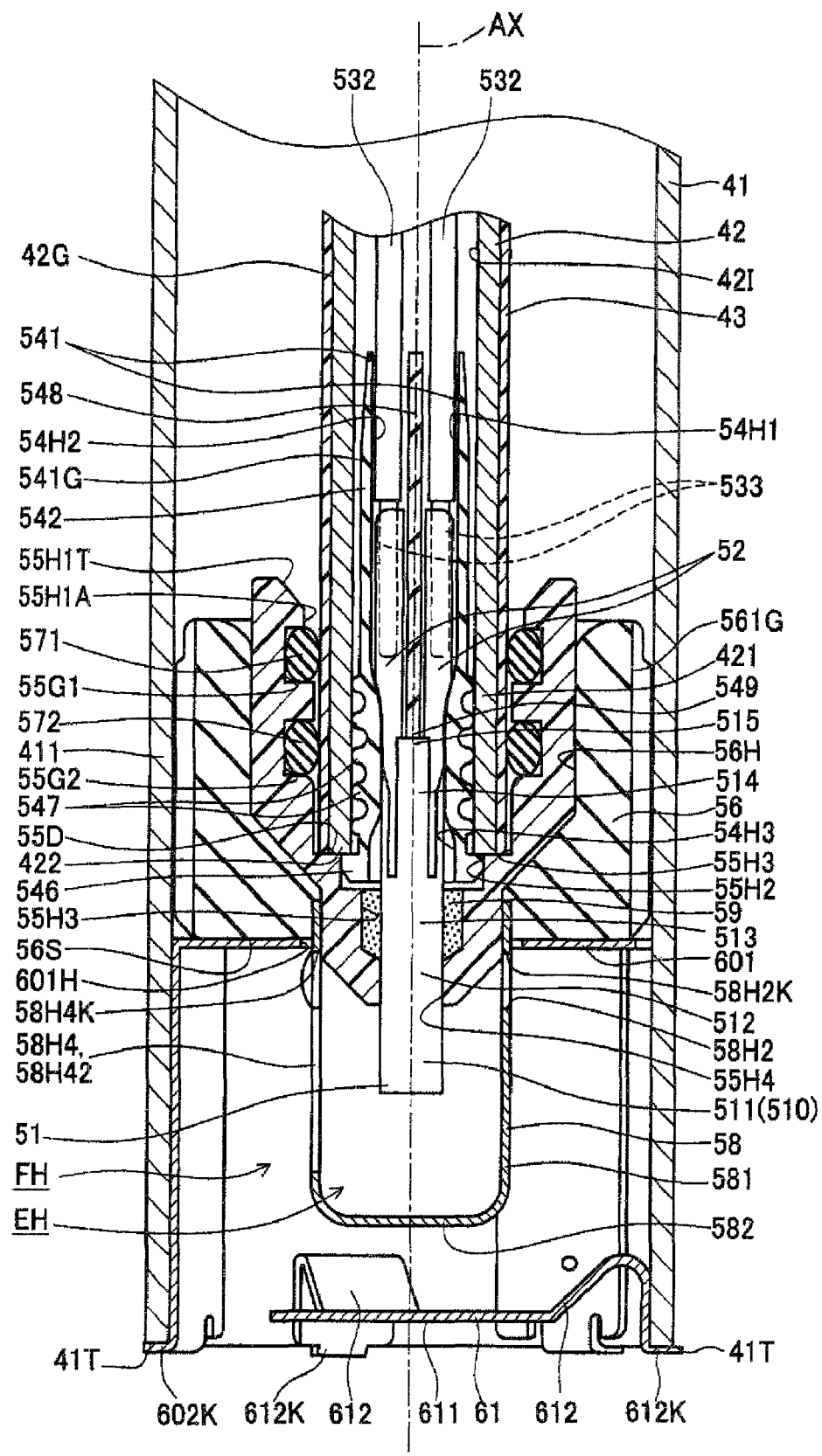
FIG. 4 is a longitudinal cross-sectional view of the liquid concentration sensor portion in a longitudinal cross section perpendicular to the longitudinal cross-sectional view of FIG. 3.

The liquid concentration sensor portion 5 is disposed on the distal end side (lower side in FIG. 1) of the liquid level sensor portion 4, and is comprised of the concentration sensor element 51, a holder member 55, a protector 58, a rubber bushing 56, and the like (see FIGS. 2 to 4).

Of these, the concentration sensor element 51 (see FIGS. 6A and 6B) is held in the holder member 55 in a form in which its distal end portion protrudes therefrom. In addition, the concentration sensor element 51 is electrically connected to the control circuit formed on the wiring board 22 through a pair of connection terminals 52 and a pair of connection cables 53 which are secured thereto by soldering. Meanwhile, the holder member 55 is fixed to and held in the distal end portion 411 of the outer cylinder 41 by the rubber bushing 56 interposed between the holder member 55 and the outer cylinder 41 surrounding it. Further, the protector 58 is held by engaging a distal end portion (small-diameter portion 553) of the holder member 55 in such a manner as to enclose a distal end portion 511 of the concentration sensor element 51 which protrudes from the holder member 55.

First, a description will be given of the concentration sensor element 51 (see FIGS. 6A and 6B) of the liquid concentration sensor portion 5. This concentration sensor element 51 has a rectangular flat shape in plan view and has two flat ceramic layers 519 (519A, 519B) and an internal wiring 516 which is liquid-tightly disposed therebetween. This internal wiring 516 includes a pair of wide internal lead wirings 517 as well as an internal heater wiring 518 disposed therebetween and folded up and down in the form of a bellows.

In addition, this concentration sensor element 51 is comprised of the distal end portion 511 protruding from the holder member 55; an insertion portion 512 which is adjacent to the proximal end side (upper side in FIG. 6A) of this distal end portion 511 and is inserted in the holder member 55; a resin holding portion 513 located on the proximal end side of this insertion portion 512; and a proximal end portion 514 to which the pair of connection terminals 52 are respectively connected by soldering. The internal heater wiring 518 is disposed in the distal end portion 511. Accordingly, in this first embodiment, a temperature rise detecting portion 510 which undergoes a temperature rise upon energization is included in the distal end portion 511.

The distal end portion 511 has a main surface 511A constituted by the aforementioned ceramic layer 519A as well as a reverse surface 511B which is parallel thereto and is constituted by the ceramic layer 519B. In addition, the temperature rise detecting portion 510 has a temperature-rise-portion main surface 511AS included in the main surface 511A and a temperature-rise-portion reverse surface 511BS included in the reverse surface 51B.

Incidentally, one ceramic layer 519A of the aforementioned ceramic layer 519 is made thinner than the other ceramic layer 519B. For this reason, heat generated in the temperature rise detecting portion 510, specifically the internal heater wiring 518, is relatively easily transmitted to the ceramic layer 519A side as compared with the ceramic layer 519B, and the outside temperature is also made easily transmittable to the internal heater wiring 518 from the relatively thin ceramic layer 519A.

Each of the connection terminals 52 is formed by bending a metal plate of a predetermined shape into a U-shape. As for this connection terminal 52, its distal end portion 521 is formed into a shape extending toward the distal end side (lower side in FIG. 6A), and is connected by soldering to an unillustrated pad formed on the distal end portion 514 of the concentration sensor element 51. The connection terminal is thus secured to the concentration sensor element 51. As a result, the connection terminal 52 (distal end portion 521) is connected to the internal lead wiring 517 through an unillustrated via conductor penetrating the one ceramic layer 519A. For this reason, upon application of a voltage across the pair of connection terminals 52, mainly the internal heater wiring 518 generates heat through the internal lead wirings 517. The resistance value of this internal heater wiring 518 varies in accordance its temperature.

Meanwhile, a conductor 533 of a lead wire 532 of the connection cable 53 is electrically and mechanically connected by soldering to a proximal end portion 522 of the connection terminal 52. As shown in FIGS. 1, 3 and 4, this connection cable 53 is inserted in the inner cylinder 42, extends toward the proximal end side, and is connected to the wiring board 22 (control circuit).

Figure 8A:
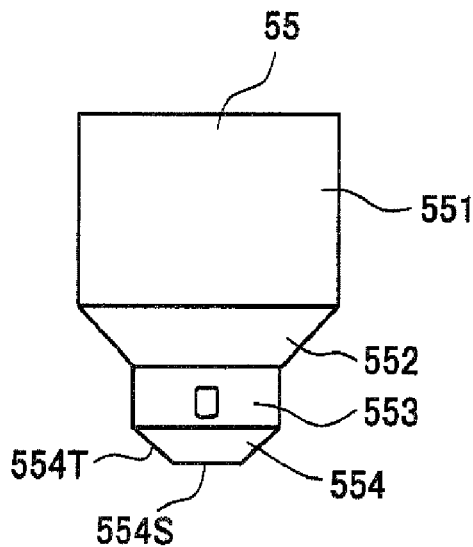
Figure 8B:
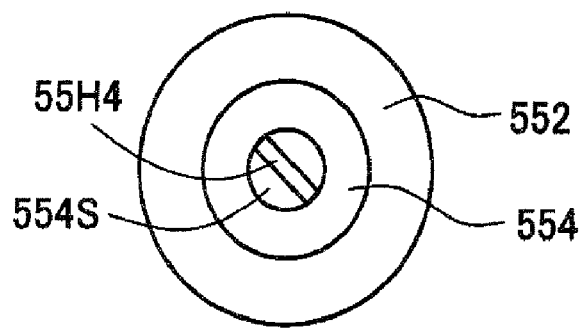

Next, a description will be given of the holder member 55 (see FIGS. 8A, 8B and 8C). The holder member 55 in its entirety is formed of an insulating resin material. The holder member 55 in terms of its outer shape includes a large-diameter portion 551 having a hollow cylindrical shape of a relatively large diameter; the small-diameter portion 553 having a hollow cylindrical shape of a relatively smaller diameter than the large-diameter portion 551; an intermediate tapered portion 552 which is located between the large-diameter portion 551 and the small-diameter portion 553 and whose outer peripheral surface is formed as a tapered surface (truncated cone surface); and a tapered distal end portion 554 which is located closer to the distal end side (lower side in FIG. 8A) than the small-diameter portion 553 and whose outer peripheral surface 554T is formed as a tapered surface (truncated cone surface).

Figure 8C:
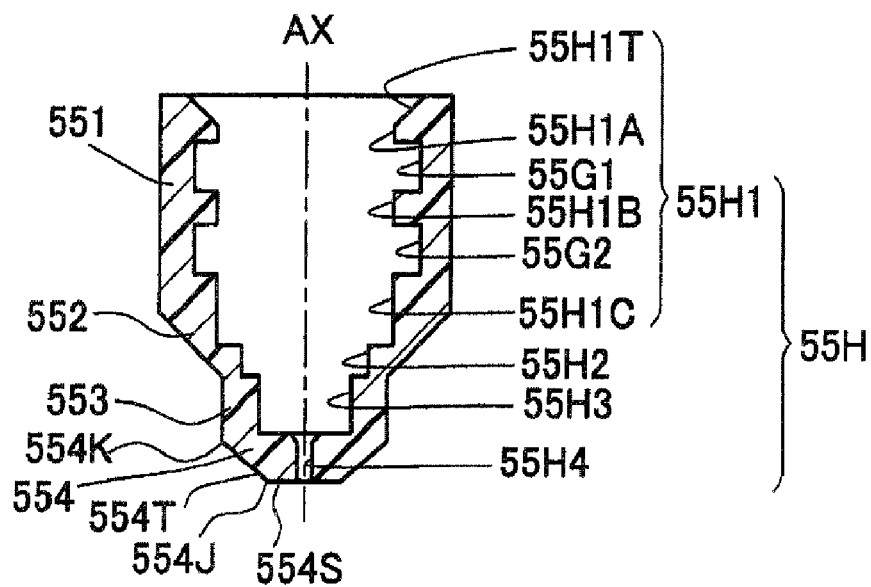

In addition, this holder member 55 is a hollow member having a holder through hole 55H penetrating itself in the axial direction, as shown in FIG. 8C. This holder through hole 55H consists of three-stage circular hole portions including an inner cylinder holding hole 55H1, a second-stage hole 55H2, and a third-stage hole 55H3 which respectively become gradually smaller in diameter from its proximal end side (upper side in the drawing), as well as an element holding hole 55H4 in the shape of a substantially square hole which is located on the most distal end side (lower side in the drawing).

As shown in FIGS. 3 and 4, this holder member 55 holds the concentration sensor element 51. Specifically, the insertion portion 512 of the concentration sensor element 51 is inserted in the element holding hole 55H4 of this holder member 55, and the resin holding portion 513 of the concentration sensor element 51 disposed in the third-stage hole 55H3 is fixed by a sealing resin 59 filled in this third-stage hole 55H3. It should be noted that the gap between the concentration sensor element 51 and the holder member 55 is liquid-tightly sealed by the sealing resin 59.

Consequently, the distal end portion 511, having the internal heater wiring 518 disposed therein in this concentration sensor element 51, is disposed so as to protrude toward the distal end side (lower side in FIG. 1) from the element holding hole 55H4 of the holder member 55.

In addition, as shown in FIG. 3 and in reference to FIG. 8C, the holder member 55 holds the distal end portion 421 of the inner cylinder 42 within the inner cylinder holding hole 55H1 of its holder through hole 55H, and the holder member 55 at its inner cylinder abutment surface 55D located between this inner cylinder holding hole 55H1 and the second-stage hole 55H2 abuts against a distal end 422 of the inner cylinder 42 to thereby position the inner cylinder 42 and the holder member 55 in the axial direction.

Two O-ring insertion grooves 55G1 and 55G2 are provided in the inner cylinder holding hole 55H1 of the holder insertion hole 55H. O-rings 571 and 572 disposed in these O-ring insertion grooves 55G1 and 55G2 liquid-tightly seal the holder member 55 and the inner cylinder 42 (insulating film 43) and hold the inner cylinder 42.

Furthermore, in the inner cylinder holding hole 55H1 of the holder insertion hole 55H, the inside diameter of an inner cylinder spacedly-opposing surface 55H1A located closer to the proximal end side (higher position side, upper side in the drawing) than the O-ring insertion groove 55G1 is made larger than the inside diameters of inner cylinder closely-opposing surfaces 55H1B and 55H1C located closer to the distal end side than the O-ring insertion groove 55G1. As such, the gap between the inner cylinder spacedly-opposing surface 55H1A and the inner cylinder 42 (insulating film 43) is made large. Further, a liquid introducing tapered surface 55H1T whose diameter is gradually enlarged toward the proximal end side, is formed on the proximal end side (upper side in the drawing) of this inner cylinder spacedly-opposing surface 55H1A. For this reason, when the urea aqueous solution NL flows between the outer cylinder 41 and the inner cylinder 42, this urea aqueous solution NL can be reliably introduced into the gap between the inner cylinder spacedly-opposing surface 55H1A and the inner cylinder 42 (insulating resin 43). As a result, it is possible to prevent errors occurring in the magnitude of the electrostatic capacity, at the same liquid level NLH, produced between the outer cylinder 41 and the inner cylinder 42 due to bubbles that are at times held between the inner cylinder spacedly-opposing surface 55H1A and the inner cylinder 42 (insulating resin 43).

Since the inner cylinder 42 and the holder member 55 holding the concentration sensor element 51 are connected as described above, a major portion of the proximal end portion 514 of the concentration sensor element 51 and the entirety of the connection terminals 52 are disposed in the inner cylinder 42. A separator 54 for resiliently holding the concentration sensor element 51 and the connection terminals 52 within the inner cylinder 42 is disposed in the distal end portion 421 of this inner cylinder 42 while insulating the concentration sensor element 51 and the connection terminals 52 from the inner cylinder 42.

Separator 54 is formed of an insulating resin having rubber-like elasticity and is a member having a substantially cylindrical outer shape. This separator 54 has a through hole wall portion 541 for forming two through holes 54H1 and 54H2 extending in the axial direction and parallel to one another and penetrating the separator 54, as well as a wall-like inter-terminal insulation portion 548 serving as a partition between the two through holes 54H1 and 54H2. The two through holes 54H1 and 54H2 are adapted for respectively inserting and holding the connection terminals 52 and the lead wires 532, as shown in FIG. 4.

In addition, distal end-side portions of these two through holes 54H1 and 54H2 are formed so as to communicate with one another through a hole communicating portion 54H3. The proximal end portion 514 of the concentration sensor element 51 is inserted into those portions of the hole communicating portion 54H3 and the through holes 54H1 and 54H2 which communicate with one another through the hole communicating portion 54H3. Accordingly, as a proximal end 515 of the concentration sensor element 51 abuts an element abutment portion 549 on the most distal end side of the inter-terminal insulation portion 548 providing a partition between the two through holes 54H1 and 54H2, it is possible to effect axial positioning of the concentration sensor element 51 with respect to the separator 54.

Furthermore, a plurality of (in this first embodiment, five) substantially ring-shaped abutment protrusions 547 are formed on a distal end portion of an outer peripheral surface 541G of this separator 54 (through hole wall portion 541). As the separator 54 is inserted in the inner cylinder 42, the abutment protrusions 547 abut an inner peripheral surface 421 of the inner cylinder 42, and the through hole wall portion 541 is thereby deformed radially inward, so that the concentration sensor element 51 is elastically held by the separator 54. As a result, even if the liquid state detecting sensor 1 mounted on an automobile or the like is subject to vibration and impact, it is possible to prevent the transmission of vibrations and impacts to the concentration sensor element 51.

In this first embodiment, the through hole wall portion 541 of this separator 54 is interposed between the inner cylinder 42 and the connection terminals 52 (see FIGS. 3 and 4). Specifically, in the separator 54 (through hole wall portion 541), a terminal-inner cylinder insulation portion 542 located in an axially central portion is interposed between the inner cylinder 42 and the connection terminals 52. As a result, it is possible to reliably prevent the connection terminals 52 from coming into contact with the inner cylinder 42 which would otherwise cause short-circuiting. In addition, the inter-terminal insulation portion 548 of the separator 54 is interposed between the pair of connection terminals 52. Hence, it is possible to reliably prevent the connection terminals 52 from coming into contact with one another and causing short-circuiting.

Furthermore, since the connection terminals 52 are also held elastically, even if vibrations and impacts are applied thereto, the vibration of the connection terminals 52 is suppressed. In addition, it is possible to appropriately prevent defects such as cracks from occurring in a portion of the connection between the connection terminal 52 and the lead wire 532 by soldering, in a connecting portion between the connection terminal 52 and the concentration sensor element 51, and in the vicinity of the connecting portions of the connection terminal 52 and the concentration sensor element 51.

In addition, in the separator 54, its inner cylinder engaging portion 546 located on the most distal end side projects radially outward (in the left-right direction in FIGS. 3 and 4) and engages a distal end 422 of the inner cylinder 42, thereby restricting the insertion depth of the separator 54 with respect to the inner cylinder 42.

Next, a description will be given of the protector 58 of the liquid concentration sensor portion 5.

As shown in FIGS. 3 to 5 and 7A to 7D, the protector 58 has a bottomed cylindrical shape and includes a cylindrical side portion 581 and a bottom portion 582 which closes the distal end side of this side portion 581 so as to enclose the distal end portion 511 of the concentration sensor element 51. When the protruding direction of the distal end portion 511 of the concentration sensor element 51 is set in the gravitational direction G (i.e., the downward direction), the side portion 581 of the protector 58 encloses the periphery in a horizontal direction H of the distal end portion 511 with an interval therebetween, as shown in FIGS. 3 and 4 and other figures. In addition, three circular liquid circulation holes 58H1, 58H2, and 58H3, as well as a keyhole-like liquid circulation hole 58H4 consisting of a circular hole portion 58H41 and an elongated slit portion 58H42 extending therefrom toward the distal end side, are formed in this side portion 581 in such a manner as to be arranged at equal intervals in the circumferential direction so as to render the urea aqueous solution NL circulatable in and outside the protector 58.

In addition, three circular lower circulation holes 58H6, 58H7, and 58H8 (see FIG. 9) are similarly formed in the bottom portion 582 so as to render the urea aqueous solution NL circulatable in and outside this protector 58. The diameters of these lower circulation holes 58H6, 58H7, and 58H8 are made smaller than those of the aforementioned circulation hole 58H1 and the like. Namely, the diameters of the liquid circulation holes 58H1, 58H2, and 58H3 and the circular hole portion 58H41 are made larger than the diameters of the lower circulation hole 58H6 and the like formed in the bottom portion 582.

Bubbles produced in the liquid generally move upward, so that it is conceivable that a majority of the bubbles entering the interior of the protector 58 (interior of an enclosed region EH to be described later) enter through the lower circulation holes 58H6 to 58H8 in the bottom portion 582. Meanwhile, the bubbles which have entered the interior of the protector 58 and further moved upward are desirably discharged appropriately from the liquid circulation holes 58H1 to 58H4 outside the protector 58 (enclosed region EH). Accordingly, in this first embodiment, the sizes of the lower circulation holes 58H6 and the like are made relatively smaller than those of the liquid circulation holes 58H1 and the like to thereby limit the sizes of the bubbles entering the interior of the protector 58 (enclosed region EH). Additionally, meanwhile, as the sizes of the liquid circulation holes 58H1 and the like are made larger than those of the lower circulation holes 58H6 and the like, the bubbles which have entered through the lower circulation holes 58H6 and the like can be appropriately discharged through the liquid circulation holes 58H1 and the like.

In addition, four retaining tongue portions 583, which are provided by forming U-shaped cut-ins and bending them inward, are formed in vicinities of the proximal end (vicinities of an upper end in the drawings) of the side portion 581 of the protector 58 so as to be arranged at equal intervals in the circumferential direction.

Figure 9:
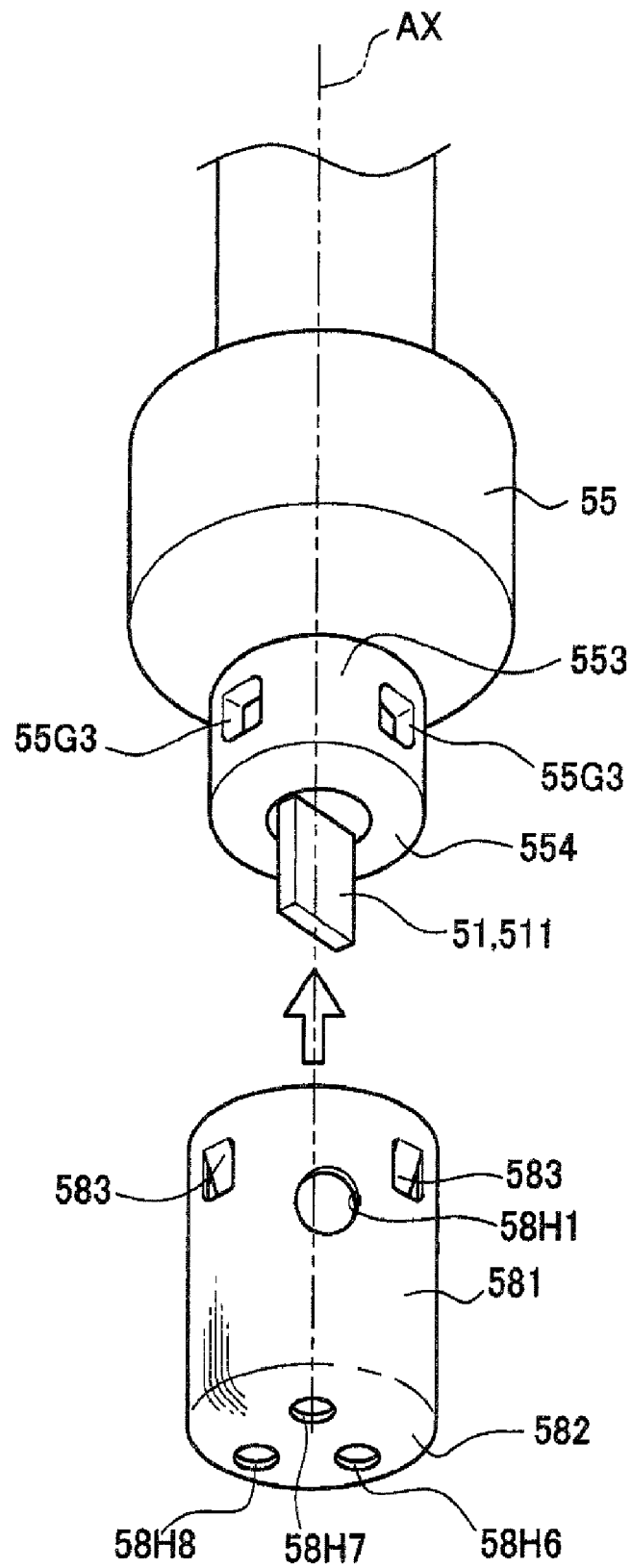
FIG. 9 is an explanatory diagram illustrating the state of coupling between the holder member and the protector.

As a result, as shown in FIG. 9, protector retaining recesses 55G3 formed in an outer periphery of the small-diameter portion 553 of the holder member 55 are retained by the retaining tongue portions 583 of the protector 58. Consequently, this protector 58 is disposed so as to enclose the small-diameter portion 553 and the tapered distal end portion 554 of this holder member 55 and the distal end portion 511 of the concentration sensor element 51, and the enclosed region EH is included in its interior. Accordingly, as for the holder member 55, the tapered outer peripheral surface 554T constituting the outer surface of the tapered distal end portion 554, as well as a flat distal end surface 554S of the tapered distal end portion 554 facing the distal end side, face this enclosed region EH (see FIGS. 5A and 5B).

Figure 5A:
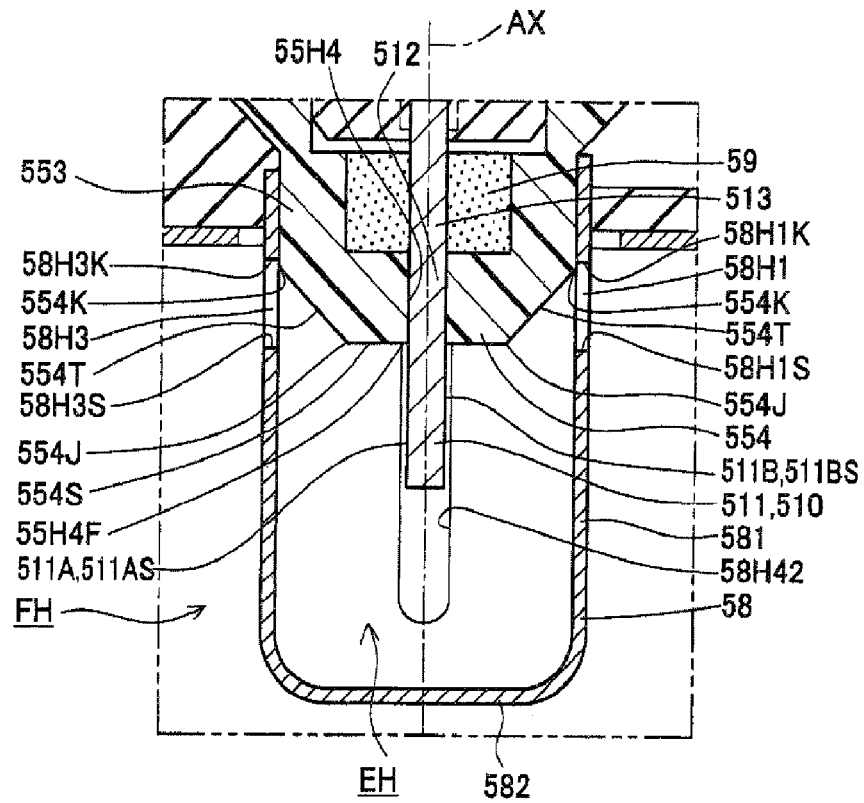
Figure 5B:
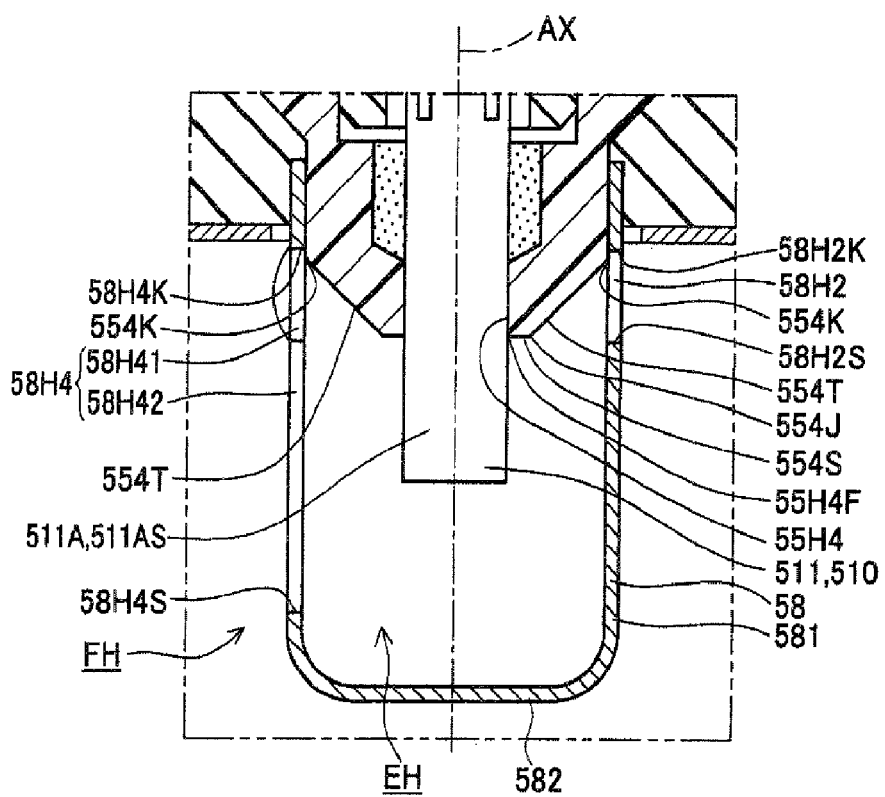

At this juncture, as shown in FIGS. 5A and 5B, the protector 58 is retained to the holder member 55 such that the respective liquid circulation holes 58H1 to 58H4 of the protector 58 are arranged at positions where they do not frontally face the main surface 511A or the reverse surface 511B of the distal end portion 511 of the concentration sensor element 51, more particularly the temperature-rise-portion main surface 511AS or the temperature-rise-portion reverse surface 511BS thereof.

Here, in a case where liquid currents in various directions have occurred in the urea aqueous solution NL, if any one of the liquid circulation holes 58H1 to 58H4 of the protector 58 frontally faces the temperature-rise-portion main surface 511AS or the temperature-rise-portion reverse surface 511BS of the distal end portion 511 of the concentration sensor element 51, the liquid current which has flowed in through this frontally facing liquid circulation hole 58H1 and the like advances so as to collide against the temperature-rise-portion main surface 511AS or the temperature-rise-portion reverse surface 511BS of the temperature rise detecting portion 510. Therefore, a large effect is likely to be produced, such as the hampering of the temperature rise of the temperature rise detecting portion 510 due to this liquid current.

By contrast, in this first embodiment, the respective liquid circulation holes 58H1 and the like of the protector 58 are arranged at positions where they do not frontally face the temperature-rise-portion main surface 511AS or the temperature-rise-portion reverse surface 511BS of the temperature rise detecting portion 510, as described above. Specifically, the respective circulation holes are arranged outside a virtual temperature-rise-portion main-surface projected region or temperature-rise-portion reverse-surface projected region in which the temperature-rise-portion main surface 511AS or the temperature-rise-portion reverse surface 511BS of the temperature rise detecting portion 510 is projected in its thicknesswise direction. For this reason, the occurrence of a liquid current advancing so as to collide against the temperature-rise-portion main surface or the temperature-rise-portion reverse surface of the temperature rise detecting portion 510 is prevented. Consequently, it is possible to reduce effects such as the hindering of the temperature rise of the temperature rise detecting portion 510 due to such liquid current. Hence, it is possible to more accurately detect the concentration of a particular component of the liquid.

Furthermore, the holder member 55 holding the concentration sensor element 51 and the protector 58 is held by the insulating rubber bushing 56 having a holder holding hole 56H of a form which fits its outer peripheral surface.

As shown in FIGS. 2 to 4, this rubber bushing 56 has a hollow cylindrical bushing body portion 561 which has the aforementioned holder holding hole 56H formed in its center and has an outside diameter allowing fitting to the outer cylinder 41, as well as the retaining projecting portions 562 which are uniformly arranged at three positions on the outer periphery of this bushing body portion 561 and project radially outward from the bushing body portion 561. The holder holding hole 56H of the bushing body portion 561 is provided with such a shape as to be brought into close contact with the holder member 55 and the protector 58 and to be capable of holding the same.

The rubber bushing 56 is held by the outer cylinder 41 as the retaining projecting portions 562 are inserted in and retained at the holding holes 41H in the outer cylinder 41. As such, the holder member 55 holding the concentration sensor element 51 and the protector 58 is held by the rubber bushing 56, and as this rubber bushing 56 is held by the outer cylinder 41, the entire liquid concentration sensor portion 5 is held between the distal end portion 411 of the outer cylinder 41 and the distal end portion 421 of the inner cylinder 42.

Furthermore, in this bushing body portion 561, a multiplicity of outer peripheral slits 561G extending in the axial direction (vertically in FIG. 2) are provided in the outer peripheral surface of this bushing body portion 561 between adjacent ones of the retaining projecting portions 562. As the rubber bushing 56 is fitted in the outer cylinder 41, these outer peripheral slits 561G form circulation passages between this bushing body portion 561 and the outer cylinder 41 so as to allow the circulation of the urea aqueous solution NL and debubbling in the axial direction (vertically in the drawing), as shown in FIGS. 3 and 4.

Figure 10:
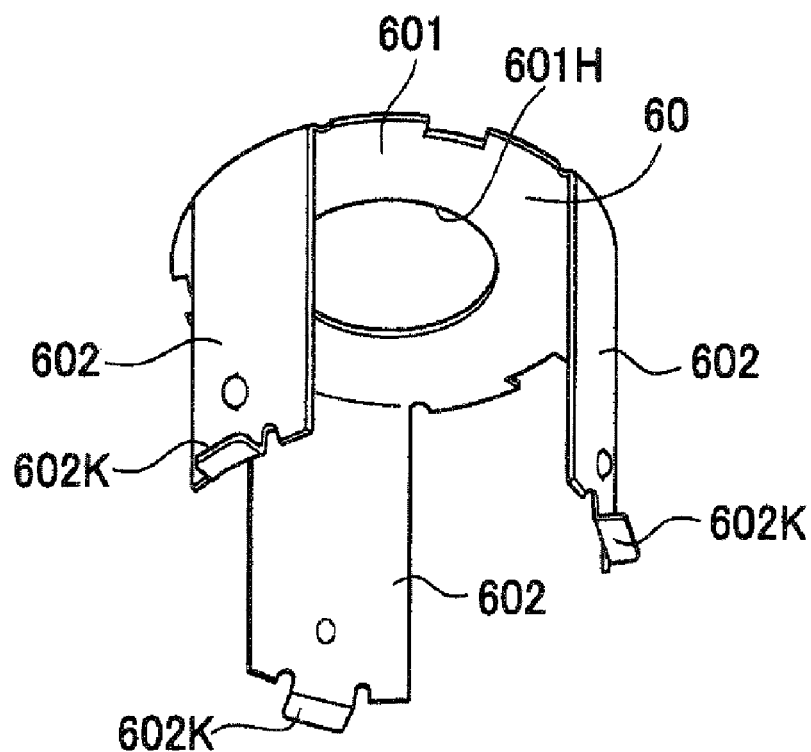
FIG. 10 is a perspective view illustrating the shape of a positioning member.

Furthermore, a positioning member 60 shown in FIG. 10 is fitted in the distal end portion 411 of the outer cylinder 41 on a side closer to the distal end side (lower side in the drawing) than the rubber bushing 56. This positioning member 60 consists of a positioning plate portion 601 which has the shape of an annular flat plate with an outside diameter substantially equal to the inside diameter of the outer cylinder 41 and which has an insertion hole 601H in its center, as well as three leg portions 602 extending from a peripheral edge of this positioning plate portion 601 in a direction perpendicular thereto. A leading end of each of these leg portions 602 is bent radially outward and is thereby formed as an engaging pawl portion 602K.

In the sensor 1 in accordance with this first embodiment, as shown in FIGS. 3 and 4, in a state in which the positioning plate portion 601 is inserted in the outer cylinder 41, the leg portions 602 of this positioning member 60 have their engaging pawl portions 602K engaged with and welded to the distal end 41T of the outer cylinder 41. Meanwhile, the positioning plate portion 601 is set in a state such that, with the protector 58 and the distal end portion 511 of the concentration sensor element 51 inserted in its insertion hole 601H, the positioning plate portion 601 abuts a flat distal end surface 56S located at the distal end of the rubber bushing 56. Since the axial (in the drawings, vertical) dimension of each leg portion 602 is predetermined, the axial positioning of the rubber bushing 56 can be performed accurately.

Figure 11:
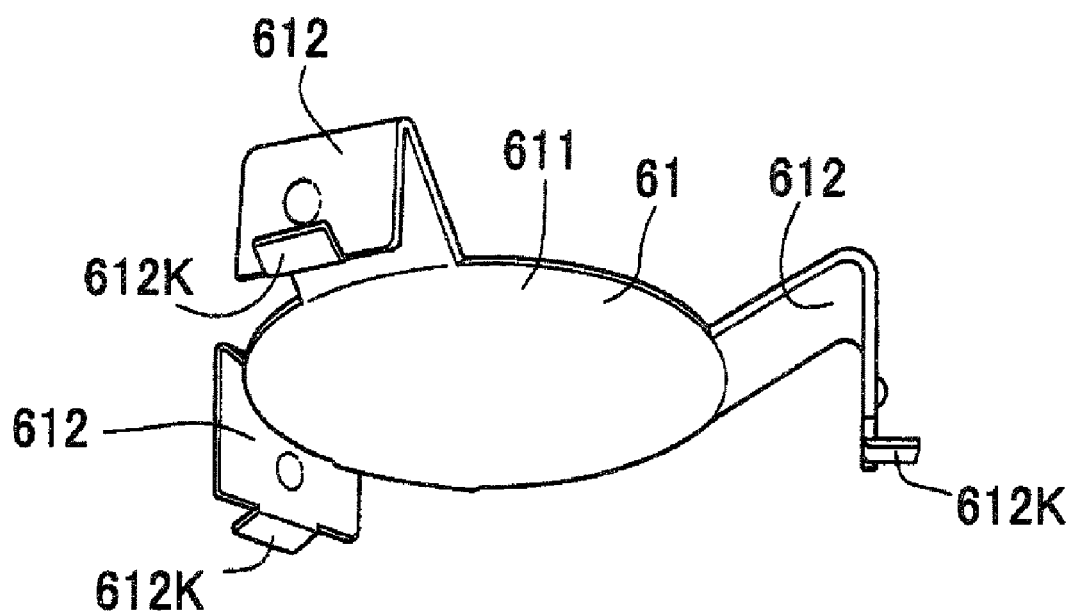
FIG. 11 is a perspective view illustrating the shape of a rectifying member.

Furthermore, a rectifying member 61 shown in FIG. 11 is fitted in the distal end portion 411 of the outer cylinder 41 on a side closer to the distal end than the positioning member 60. This rectifying member 61 consists of a disk-shaped rectifying plate portion 611 whose outside diameter is smaller than the inside diameter of the outer cylinder 41, as well as three substantially inverse V-shaped leg portions 612 extending diagonally toward the proximal end side (upward) from a peripheral edge of this rectifying plate portion 611 and then extending diagonally toward the distal end side (downward) in the drawing. The leading end of this leg portion 612 is bent radially outward and is thereby formed as an engaging pawl portion 612K.

In the sensor 1 in accordance with this first embodiment, as shown in FIGS. 3 and 4, in a state in which the positioning plate portion 601 is inserted and secured in the outer cylinder 41, the leg portions 612 of this rectifying member 61 have their engaging pawl portions 612K engaged with and welded to the distal end 41T of the outer cylinder 41. It should be noted that the engaging pawl portions 602K of the aforementioned positioning member 60 and the engaging pawl portions 612K of this rectifying member 61 are welded at positions offset from each other by 60° about the axis AX.

As a result, the rectifying plate portion 611 of the rectifying member 61 is set in a state in which it closes a portion (central portion) of the opening at the distal end portion 411 of the outer cylinder 41. Specifically, when the sensor 1 (outer cylinder 41) is viewed from the axially distal end side (lower side in FIGS. 3 and 4), the bottom portion 582 of the protector 58 is set in a state in which it is invisible due to the rectifying plate portion 611 of the rectifying member 61. By providing the above-described arrangement, in a case where the urea aqueous solution NL stored in the tank (not shown) has moved due to vibration and a violent liquid current has been indicated in the tank, particularly when a liquid current directed from the lower side of the outer cylinder 41 toward the concentration sensor element 51 of the sensor 1 located thereabove, the rectifying plate portion 611 retards the progression of such a liquid current. For this reason, it is possible to appropriately suppress a defect in which such a liquid current enters the interior of the protector 58 (interior of the enclosed region EH) through the holes such as the lower circulation holes 58H6 provided in the bottom portion 582 of the protector 58. Such defect produces a liquid current which strongly strikes the concentration sensor element 51, causing the output of the concentration sensor element 51 to fluctuate.

Furthermore, in the sensor 1 in accordance with this first embodiment, as shown in FIGS. 3, 4, 5A, and 5B, the liquid circulation holes 58H1 to 58H4 provided in the side portion 581 of the protector 58 and the tapered distal end portion 554 of the holder member 55 for holding the concentration sensor element 51 are set in the following relationship.

Namely, the tapered distal end portion 554 is made up by the flat distal end surface 554S perpendicular to the axis AX and the tapered outer peripheral surface 554T whose diameter is gradually enlarged toward the proximal end side (upper side in the drawings). Furthermore, the liquid circulation holes 58H1 to 58H4 are arranged such that their proximal ends 58H1K, 58H2K, 58H3K, and 58H4K located at the highest positions in the rims of the liquid circulation holes 58H1 to 58H4 are located higher than a proximal edge 554K of this outer peripheral surface 554T. Additionally, the liquid circulation holes 58H1 to 58H4 are also arranged such that their distal ends 58H1S, 58H2S, 58H3S, and 58H4S located at the lowest positions in the rims of the liquid circulation holes 58H1 to 58H4 are located lower than the proximal edge 554K of the outer peripheral surface 554T.

By providing the above-described arrangement, even in cases where bubbles have entered the interior of the enclosed region EH, these bubbles rise upward along the tapered outer peripheral surface 554T and move radially outward without stagnating around the distal end portion 511 of the concentration sensor element 51. In addition, it is difficult for bubbles which have moved radially outward to return to a surrounding region of the distal end portion 511 on the radially inward side. Further, as for the liquid circulation holes 58H1 to 58H4, their proximal ends (upper ends) 58H1K and the like are located higher than the proximal edge 554K, and their distal ends (lower ends) 58H1S and the like are located lower than the proximal edge 554K. Therefore, the bubbles in the vicinity of this proximal edge 554K are easily discharged outside the protector 58 through the respective liquid circulation holes 58H1 to 58H4.

Specifically, in the holder member 55, either portion of the distal end surface 554S and the outer peripheral surface 554T facing the enclosed region EH enclosed by the protector 58 is provided with a form so as to be located higher than or at the same height as a hole rim 55H4F (lowest hole periphery) of the element holding hole 55H4 of the holder member 55. In addition, as for the respective liquid circulation holes 58H1 to 58H4, their proximal ends (upper ends) 58H1K to 58H4K are set higher than the hole rim 55H4F of the element holding hole 55H4. Furthermore, their distal ends (lower ends) 58H1S to 58H4S are set lower than the proximal edge (surface peripheral edge) 554K of the outer peripheral surface 554T of the tapered distal end portion 554.

For this reason, the bubbles which have entered the interior of the enclosed region EH can be discharged from the liquid circulation holes 58H1 and the like located higher than the periphery of the concentration sensor element 51. In other words, the liquid circulation holes 58H1 to 58H4 serve not only as holes for the circulation of the liquid but also as bubble-discharging holes for appropriately discharging the bubbles which have entered the interior of the enclosed region EH.

It should be noted that, in this first embodiment, since the distal end surface 554S of the holder member 55 is formed as a flat surface perpendicular to the axis AX, every portion of the hole rim 55H4F of the element holding hole 55H4 is at the same height. Accordingly, every portion of the hole rim 55H4F is formed as a lowest hole periphery of this hole rim 55H4F.

In addition, in the holder member 55, its distal end surface 554S is formed as a flat surface of the same height, while its outer peripheral surface 554T is formed as a tapered surface located higher than the same. In other words, in either portion of the distal end surface 554S and the outer peripheral surface 554T facing the enclosed region EH, when a comparison is made of the respective portions, a portion on a side closer to the proximal edge (surface peripheral edge) 554K is provided with a form so as to be located higher or at the same height. Specifically, the distal end surface 554S even at a position close to the proximal edge (surface peripheral edge) 554K is located at the same height as the hole rim 55H4F of the element holding hole 55H4. In addition, as for the outer peripheral surface 554T, the closer to the proximal edge (surface peripheral edge) 554K the portion is, the higher its position.

Moreover, as described above, as for the liquid circulation holes (bubble-discharging holes) 58H1 and the like, their proximal ends (upper ends) 58H1K and the like are located higher than the proximal edge (surface peripheral edge) 554K of the outer peripheral surface 554T, and their distal ends (lower ends) 58H1S and the like are located lower than the proximal edge (surface peripheral edge) 554K of the outer peripheral surface 554T.

Since the distal end surface 554S and the outer peripheral surface 554T of the holder member 55 are thus set, the bubbles which have reached the distal end surface 554S or the outer peripheral surface 554T can be moved radially outward along these surfaces and can be easily discharged outside the protector 58 through the liquid circulation holes 58H1 and the like.

Furthermore, the holder member 55 has its lower end surface (the distal end surface 554S and the outer peripheral surface 554T) formed by the distal end surface 554S around the element holding hole 55H4 and by the outer peripheral surface 554T which is located on the surface peripheral edge side (proximal edge side) of this lower end surface, the outer peripheral surface 554T including the proximal surface peripheral edge 554K, i.e., the surface peripheral edge of this lower end surface, and being higher than the distal end surface 554S.

By providing the above-described arrangement, the outer peripheral surface 554T is located higher than the distal end surface 554S to form a "pocket." Once the bubbles have moved to the outer peripheral surface 554T side, it is difficult for the bubbles to return to the distal end surface 554S side. Accordingly, the bubbles which entered the enclosed region EH can be reliably moved toward the proximal surface edge 554K. Moreover, in terms of the relationship with the bubble-discharging holes (liquid circulation holes) 58H1 and the like as well, the bubbles can be discharged more appropriately since the above-described arrangement is provided.

It should be noted that the distal end surface 554S and the outer peripheral surface 554T in this first embodiment correspond to the lower end surface in the invention. In addition, the distal end surface 554S corresponds to the element surrounding surface, and the outer peripheral surface 554T to the peripheral side surface.

Figure 12:
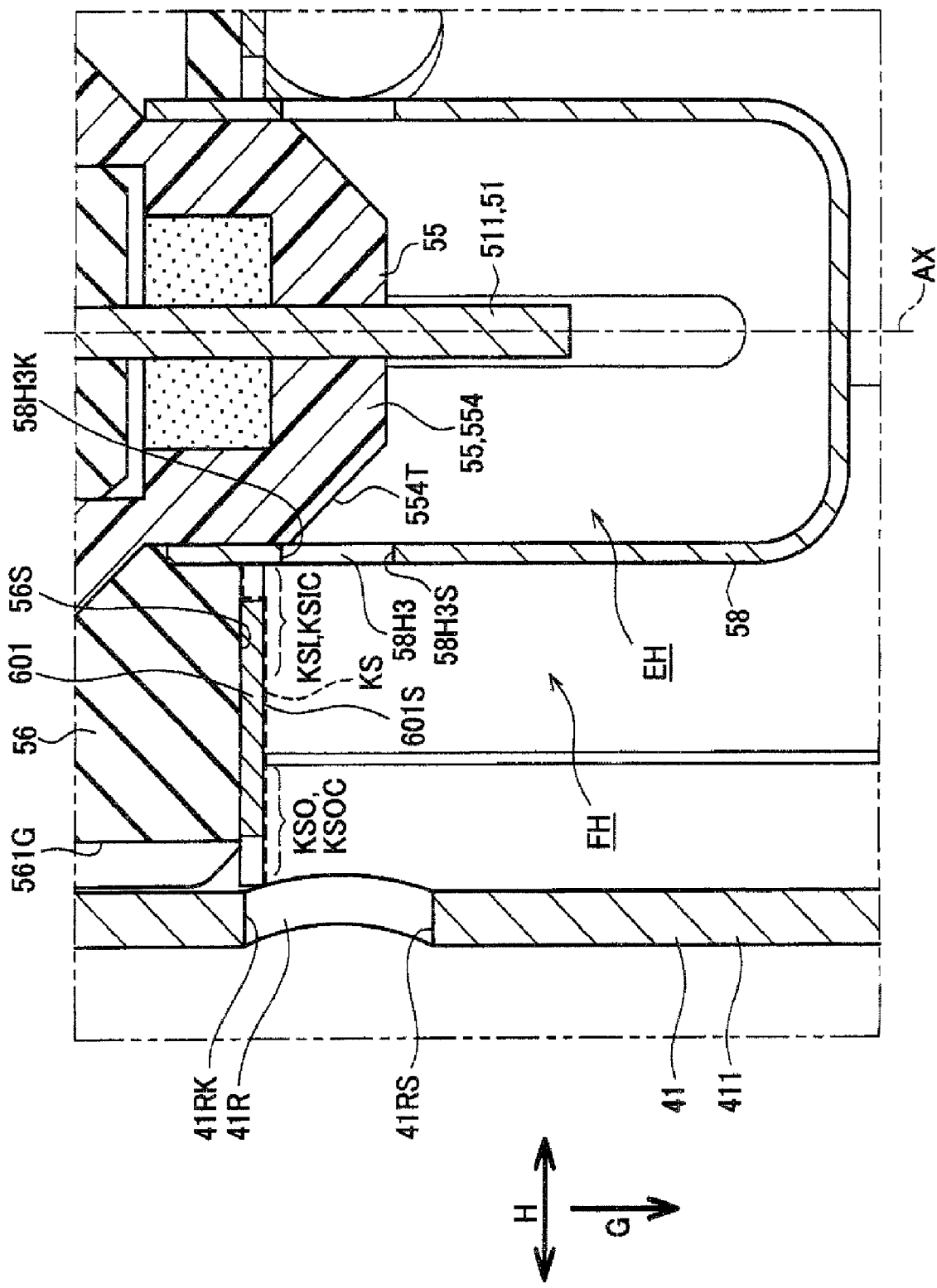
FIG. 12 is a partially enlarged explanatory diagram of the longitudinal cross-sectional view shown in FIG. 3, and illustrates the positional relationship among the protector, an outer cylinder, the rubber bushing, and the positioning member.

Referring to FIG. 12, a description will be given of the relationships among the liquid circulation holes 58H1 to 58H4 of the protector 58, the circulation holes 41R of the outer cylinder 41, the distal end surface 56S of the rubber bushing 56, and a distal end surface 601S of the positioning plate portion 601 of the positioning member 60 in the sensor 1 in accordance with the first embodiment (see FIGS. 2, 3 and 10 as well). It should be noted that the liquid circulation holes 58H1 to 58H4 of the protector 58 correspond to the circulation holes and the bubble-discharging holes of the enclosing member. In addition, the circulation holes 41R of the outer cylinder 41 correspond to the outer circulation holes and the outer bubble-discharging holes of the outer enclosing member. Further, the distal end surface 56S of the rubber bushing 56 and the distal end surface 601S of the positioning plate portion 601 of the positioning member 60 correspond to the interposed member lower surface of the interposed member. The circulation holes 41R not only allow the urea aqueous solution NL to circulate therethrough but have their proximal ends 41RK (upper ends) located higher than the proximal ends 58H1K to 58H4K (upper ends) of the liquid circulation holes 58H1 to 58H4 (bubble-discharging holes), as can be appreciated from FIG. 12.

The distal end portion 411 of the hollow cylindrical outer cylinder 41 encloses the periphery in the horizontal direction H of the distal end portion 511 of the concentration sensor element 51 and the periphery in the horizontal direction H of the protector 58 with an interval provided with respect to the protector 58. Accordingly, an outer enclosed region FH is formed between the distal end portion 411 of this outer cylinder 41 and the protector 58.

In addition, as described above, the three circulation holes 41R allowing the urea aqueous solution NL to be circulated between the outer enclosed region FH and the outside in the horizontal direction H of the distal end portion 411 of the outer cylinder 41 are bored in the distal end portion 411 of the outer cylinder 41 at equal intervals in the circumferential direction. These circulation holes 41R respectively have the same shape and are arranged at the same position as viewed in the direction of the axis AX (gravitational direction G).

Further, the rubber bushing 56 and the positioning member 60 are interposed between the protector 58 and the distal end portion 411 of the outer cylinder 41. The rubber bushing 56 and the positioning plate portion 601 of the positioning member 60 are located on the proximal end side (upper side in the drawings) of the outer enclosed region FH, and the distal end surface 56S of the rubber bushing 56 and the distal end surface 601S of the positioning plate portion 601 face the outer enclosed region FH. Namely, as for the rubber bushing 56 and the positioning plate portion 601 of the positioning member 60, which correspond to the interposed members, the distal end surface 56S and the distal end surface 601S constitute an interposed member lower surface KS indicated by the broken line along them in FIG. 12.

This interposed member lower surface KS has an annular shape between the protector 58 and the distal end portion 411 of the outer cylinder 41, and since the distal end surface 601S occupies a major portion of the interposed member lower surface KS, substantially the entire portion of the interposed member lower surface KS has a horizontal surface. Accordingly, in this interposed member lower surface KS, an annular portion located on the protector 58 side (inner side) is set as an inner peripheral portion KSI, and an annular portion located on the outer cylinder 41 side (outer side) is set as an outer peripheral portion KSO.

In addition, in this inner peripheral portion KSI, respective portions located outwardly of the liquid circulation holes 58H1 to 58H4 (liquid circulation hole 58H3 being shown in FIG. 12) in the horizontal direction H (left-right direction in the drawing) are set as discharge-hole corresponding portions KSIC. Meanwhile, in the outer peripheral portion KSO, respective portions located inwardly of the circulation holes 41R in the horizontal direction H (left-right direction in the drawing) are set as outer-discharge-hole corresponding portions KSOC.

Then, in this first embodiment, it can be appreciated that, in the inner peripheral portion KSI of the interposed member lower surface KS, the discharge-hole corresponding portions KSIC are respectively set higher than the upper ends 58H1K to 58H4K of the corresponding liquid circulation holes 58H1 to 58H4. As described above, the bubbles which have entered the interior of the enclosed region EH (protector 58) rise upward along the outer peripheral surface 554T of the tapered distal end portion 554 of the holder member 55 and move radially outward without stagnating around the distal end portion 511 of the concentration sensor element 51. The bubbles which moved radially outward are then discharged outside the protector 58 through the liquid circulation holes 58H1 to 58H4. At this juncture, since the discharge-hole corresponding portions KSIC are respectively set higher than the upper ends 58H1K to 58H4K of the corresponding liquid circulation holes 58H1 to 58H4, as described above, the bubbles can be reliably discharged through the liquid circulation holes 58H1 to 58H4.

In addition, it can be appreciated that, in the outer peripheral portion KSO of the interposed member lower surface KS, the outer-discharge-hole corresponding portions KSOC are respectively set higher than distal ends 41RS (lower ends) of the corresponding circulation holes 41R. Accordingly, in cases where the bubbles are located in the vicinity of these outer-discharge-hole corresponding portions KSOC, the bubbles can be discharged outside the outer cylinder 41 through the respective circulation holes 41R.

Moreover, the interposed member lower surface KS substantially in its entirety has a horizontal surface, as described above. Accordingly, when the bubbles (bubble groups) which have entered the interior of the enclosed region EH are discharged through the liquid circulation holes 58H1 to 58H4, the bubbles (bubble groups) move so as to expand along the interposed member lower surface KS in the upper portion of the outer enclosed region FH. As a result, some of the bubble groups move from the discharge-hole corresponding portions KSIC to the outer-discharge-hole corresponding portions KSOC along the interposed member lower surface KS.

Thus, the bubbles (bubble groups) discharged through the liquid circulation holes 58H1 to 58H4 can be discharged outside the outer cylinder 41 through the respective circulation holes 41R.

It should be noted that in cases where the liquid currents and vibrations are small, the bubbles move from the discharge-hole corresponding portions KSIC to the outer-discharge-hole corresponding portions KSOC along the interposed member lower surface KS. As is apparent from FIG. 12 as well, all portions of this interposed member lower surface KS are set higher than the proximal ends 58H1K to 58H4K (upper ends) of the liquid circulation holes 58H1 to 58H4 corresponding to the discharge-hole corresponding portions KSIC. Accordingly, the bubbles (bubble groups) which have once been discharged to the outer enclosed region FH through the liquid circulation holes 58H1 to 58H4 are prevented from flowing backward into the enclosed region EH (into the protector 58).

Next, a description will be given of the operation of the liquid concentration sensor portion 5 of the sensor 1 in the detection of the concentration of the urea aqueous solution NL.

In the liquid state detecting sensor 1 in accordance with this first embodiment, an electric current of a predetermined magnitude is allowed to flow across the concentration sensor element 51 of the liquid concentration sensor portion 5 for a predetermined time duration (e.g., 700 ms) from the control circuit configured on the wiring board 22 to cause the internal heater wiring 51B to generate heat. Thereupon, a change in the detected voltage is detected by the control circuit to detect the concentration of the urea aqueous solution NL. Specifically, a detected voltage immediately after the start of energization of the concentration sensor element 51 and a detected voltage after the lapse of a predetermined time from the energization start are measured. The concentration of the urea aqueous solution NL corresponding to the change in detected voltage is obtained from the relationship between the amount of change and concentration of the urea aqueous solution NL obtained in advance.

It should be noted that in this first embodiment the detection of the concentration of the urea aqueous solution NL is effected using a CPU and the like in the control circuit, and a signal representative of the concentration information obtained from this control circuit is outputted to an external circuit (e.g., an ECU) through the external connection cable 24. In this external circuit, on the basis of the signal representative of the inputted concentration information, a determination is made as to whether or not the concentration of the urea aqueous solution NL is within a requisite range, and if it is not within the proper concentration range, processing such as informing the driver to that effect is carried out, as required.

(Modification)

Next, referring to FIG. 13, a description will be given of a modification of the first embodiment described above.

A sensor 1001 in accordance with this modification differs from that of the above-described first embodiment only in the shape of the distal end portion of the holder member, so that only different parts will be described. In addition, different reference numerals are attached to only those portions that differ from the above-described first embodiment.

In the above-described first embodiment, the holder member 55 includes at its distal end portion the tapered distal end portion 554 having the flat distal end surface 554S perpendicular to the axis AX and the tapered outer peripheral surface 554T whose diameter is gradually enlarged toward the proximal end side.

Figure 13A:
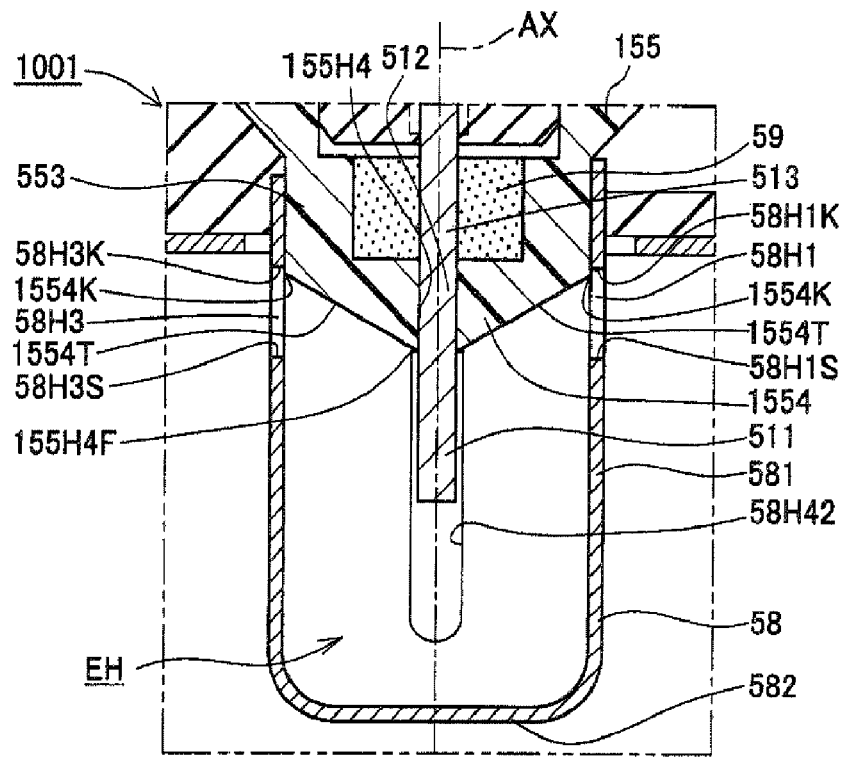
FIGS. 13A and 13B are partially enlarged longitudinal cross-sectional views illustrating the relationship among the concentration sensor element, the holder member, and the protector in accordance with a modification.
Figure 13B:
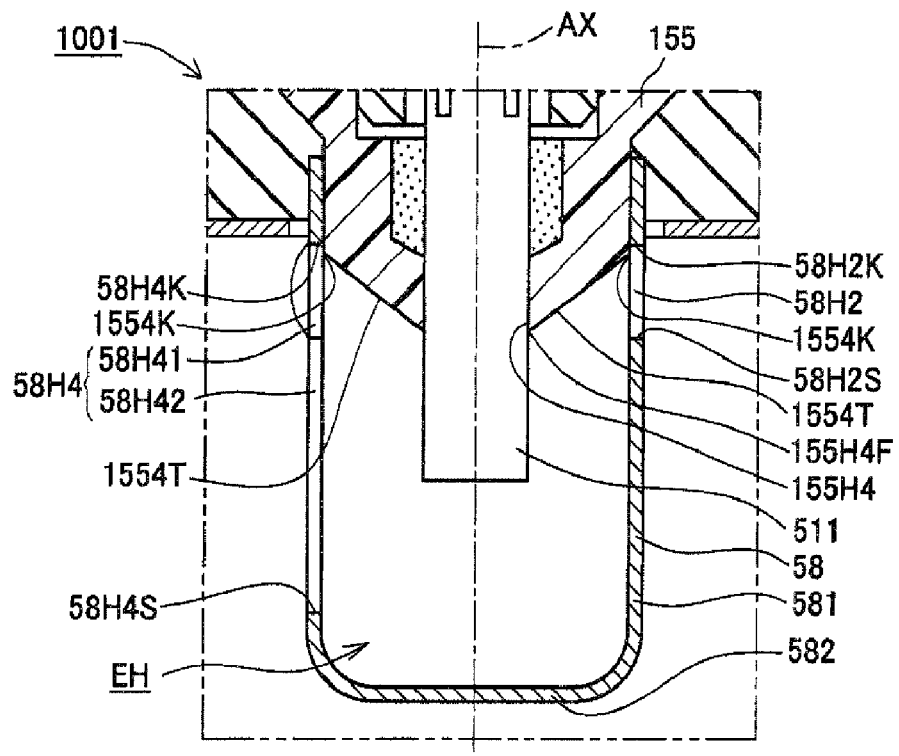

In contrast, as shown in FIGS. 13A and 13B, a holder member 155 of the sensor 1001 in accordance with this modification does not have a flat distal end surface but has a tapered outer peripheral surface 1554T whose diameter is gradually enlarged radially outward from a hole rim 155H4F of an element holding hole 155H4 toward the proximal end side. Namely, a tapered distal end portion 1554 enclosed by the protector 58 is provided with a form such that its outer peripheral surface 1554T (lower end surface) facing the enclosed region EH becomes gradually higher from the hole rim 155H4F of the element holding hole 155H4 toward the proximal edge 1554K (surface peripheral edge) of the outer peripheral surface 1554T.

In other words, if the outer peripheral surface 1554T (lower end surface) is viewed along a route from the hole rim 155H4F of the element holding hole 155H4 to the proximal edge 1554K (surface peripheral edge) of the outer peripheral surface 1554T, a portion which becomes gradually higher appears in contrast to the above-described first embodiment in which a portion which becomes higher in a stepped form appears.

Accordingly, in this sensor 1001, once the bubbles move to the proximal edge (surface peripheral edge) 1554K side of the outer peripheral surface 1554T, it is difficult for the bubbles to return to the element holding hole 155H4 side. Therefore, the bubbles which have entered the enclosed region EH can be moved even more smoothly along the outer peripheral surface 1554T toward its proximal edge (surface peripheral edge) 1554K and can be discharged outside the protector 58 through the liquid circulation holes 58H1 to 58H4. The effect of bubbles on the concentration detection by the concentration sensor element 51 can thus be further suppressed.

It should be noted that, in this modification as well, the relationship between the holder member 155 and the liquid circulation holes 58H1 to 58H4 is the same as in the above-described embodiment. Namely, all portions of the outer peripheral surface (lower end surface) 1554T of the holder member 155 are set in such a form as to be located higher than the hole rim (lowest hole periphery) 155H4F of the element holding hole 155H4.

Further, as for the liquid circulation holes 58H1 and the like, their proximal ends (upper ends) 58H1K and the like are located higher than the hole rim 155H4F, and their distal ends (lower ends) 58H1S and the like are located lower than the proximal edge (surface peripheral edge) 1554K of the outer peripheral surface (lower end surface) 1554T.

Furthermore, as for the liquid circulation holes 58H1 and the like, their proximal ends (upper ends) 58H1K and the like are located higher than the proximal edge (surface peripheral edge) 1554K of the outer peripheral surface (lower end surface) 1554T, and their distal ends (lower ends) 58H1S and the like are located lower than the proximal edge (surface peripheral edge) of the outer peripheral surface (lower end surface).

Also, the relationships among the liquid circulation holes 58H1 to 58H4 of the protector 58, the circulation holes 41R of the outer cylinder 41, the distal end surface 56S of the rubber bushing 56, and the distal end surface 601S of the positioning plate portion 601 of the positioning member 60 are similar to those of the above-described first embodiment. Accordingly, also similar is the fact that the bubbles (bubble groups) discharged through the liquid circulation holes 58H1 to 58H4 can be discharged outside the outer cylinder 41 through the respective circulation holes 41R.

Second Embodiment

Next, referring to FIGS. 14 to 21D, a description will be given of a second embodiment of the invention. A sensor 2001 in accordance with the second embodiment differs from the above-described first embodiment only in that the respective shapes of the holder member, the rubber bushing, the protector, the positioning member, and the rectifying member slightly differ. Therefore, a description will be given centering on differing portions, and a description of similar portions will be omitted or simplified.

The liquid state detecting sensor 2001 (see FIG. 14) in accordance with the second embodiment is used as a device for detecting the concentration of the urea aqueous solution NL accommodated in the accommodation tank and for detecting the liquid level NLH of the urea aqueous solution NL. In the same way as in the first embodiment, the liquid state detecting sensor 2001 includes proximal portion 2 and a sensor portion 3 extending therefrom downward in the drawings. Proximal portion 2 is mounted around the opening of an accommodation tank (not shown), sensor portion 3 is set at an attitude so as to extend in the gravitational direction G, and sensor portion 3 is immersed in the urea aqueous solution NL.

Accordingly, also in the description of this sensor 2001 and its respective parts, a description will be given by setting the upper side in FIG. 14 as the proximal end side and the lower side as the distal end side in the direction (axial direction) along the axis AX shown in FIG. 14.

In addition, in cases where portions related to the attitude of the sensor 2001 and the gravitational direction G are specified or described, a description will be given on the basis of an attitude in which the direction in which the sensor portion 3 extends relative to the proximal portion 2 (downward direction in the direction (axial direction) along the axis AX shown in FIG. 14) is set as the gravitational direction G.

In the liquid state detecting sensor 2001, the proximal portion 2 is similar to that of the first embodiment. Meanwhile, the sensor portion 3 consists of the liquid level sensor portion 4 similar to that of the first embodiment, as well as a liquid concentration sensor portion 2005 which is located on a side closer to the distal end than the same and is positioned on the lower position side when in use. Accordingly, a description of the proximal portion 2 and the liquid level sensor portion 4 will be omitted.

Next, a description will be given of the liquid concentration sensor portion 5. In the same way as the liquid concentration sensor portion 5 of the first embodiment, this liquid concentration sensor portion 2005 is disposed on the distal end side (lower side in FIG. 14) of the liquid level sensor portion 4. This liquid concentration sensor portion 2005 is comprised of, in addition to the concentration sensor element 51 and the separator 54 similar to those of the first embodiment, a holder member 255, a protector 258, a rubber bushing 256, and the like whose shapes are slightly different from those of the first embodiment (see FIGS. 14 to 21D).

In addition, in the same way as in the first embodiment, the concentration sensor element 51 (see FIGS. 6A and 6B) is held in the holder member 255 so that the distal end portion of the sensor element 51 protrudes therefrom. Further, the concentration sensor element 51 is electrically connected to the control circuit formed on the wiring board 22 through a pair of connection terminals 52 and the pair of connection cables 53 which are secured thereto by soldering. Meanwhile, the holder member 255 is fixed to and held in the distal end portion 411 of the outer cylinder 41 by the rubber bushing 256 interposed between the holder member 255 and the outer cylinder 41 surrounding it. Further, the protector 258 is held by engaging a distal end portion (small-diameter portion 2553) of the holder member 255 so as to enclose the distal end portion 511 of the concentration sensor element 51 which protrudes from the holder member 255.

In the liquid concentration sensor portion 2005, the concentration sensor element 51 (see FIGS. 6A and 6B) and the separator 54 are similar to those of the first embodiment, so that a description thereof will be omitted. In addition, since the holder member 255 (see FIGS. 15 and 16) for holding the concentration sensor element 51 is also similar to that of the first embodiment except for the shape of its distal end portion (outer peripheral surface 2554T of a tapered distal end portion 2554), a description thereof will be omitted. It should be noted that the outer peripheral surface 2554T of the tapered distal end portion 2554 of the holder member 255 is formed into a tapered surface (truncated cone surface), and only differs in that it is gently tapered as compared with the outer peripheral surface 554T (see FIG. 12) in the first embodiment.

Next, a description will be given of the protector 258. As shown in FIGS. 3 to 5 and 7A to 7D, protector 258 has a bottomed cylindrical shape and includes a cylindrical side portion 2581 and a bottom portion 2582 which closes the distal end side of this side portion 2581. When the protruding direction of the distal end portion 511 of the concentration sensor element 51 is set to the gravitational direction G, the side portion 2581 encloses the periphery in the horizontal direction H of distal end portion 511 with an interval therebetween. In addition, four circular upper liquid circulation holes 258H1 and four circular lower liquid circulation holes 258H2 located on distal end sides thereof are respectively formed in the side portion 2581 so as to be arranged at equal intervals in the circumferential direction. In this manner, the urea aqueous solution NL is able to circulate in and out of the protector 258.

In addition, one circular lower circulation hole 258H6 is formed in the bottom portion 2582 so as to allow the urea aqueous solution NL to circulate in and out of the protector 258.

In addition, in the same way as in the first embodiment, four retaining tongue portions 2583, which are provided by forming U-shaped cut-ins and bending them inward, are formed in vicinity of the proximal end (vicinity of an upper end in the drawings) of the side portion 2581 of the protector 258 in such a manner as to be arranged at equal intervals in the circumferential direction. As these retaining tongue portions 2583 are engaged with protector retaining recesses 255G3 in the holder member 255 to thereby retain the retaining tongue portions 2583 of the protector 258. Consequently, the protector 258 is disposed so as to enclose the tapered distal end portion 2554 of the holder member 255 and the distal end portion 511 of the concentration sensor element 51, and the enclosed region EH is included in its interior. Accordingly, as for the holder member 255, the tapered outer peripheral surface 2554T of the tapered distal end portion 2554, as well as a flat distal end surface 2554S of the tapered distal end portion 2554 facing the distal end side, face this enclosed region EH.

Furthermore, the holder member 255 holding the concentration sensor element 51 and the protector 258 is held by the insulating rubber bushing 256 having a holder holding hole 256H of a form which fits its outer peripheral surface.

Figure 18:
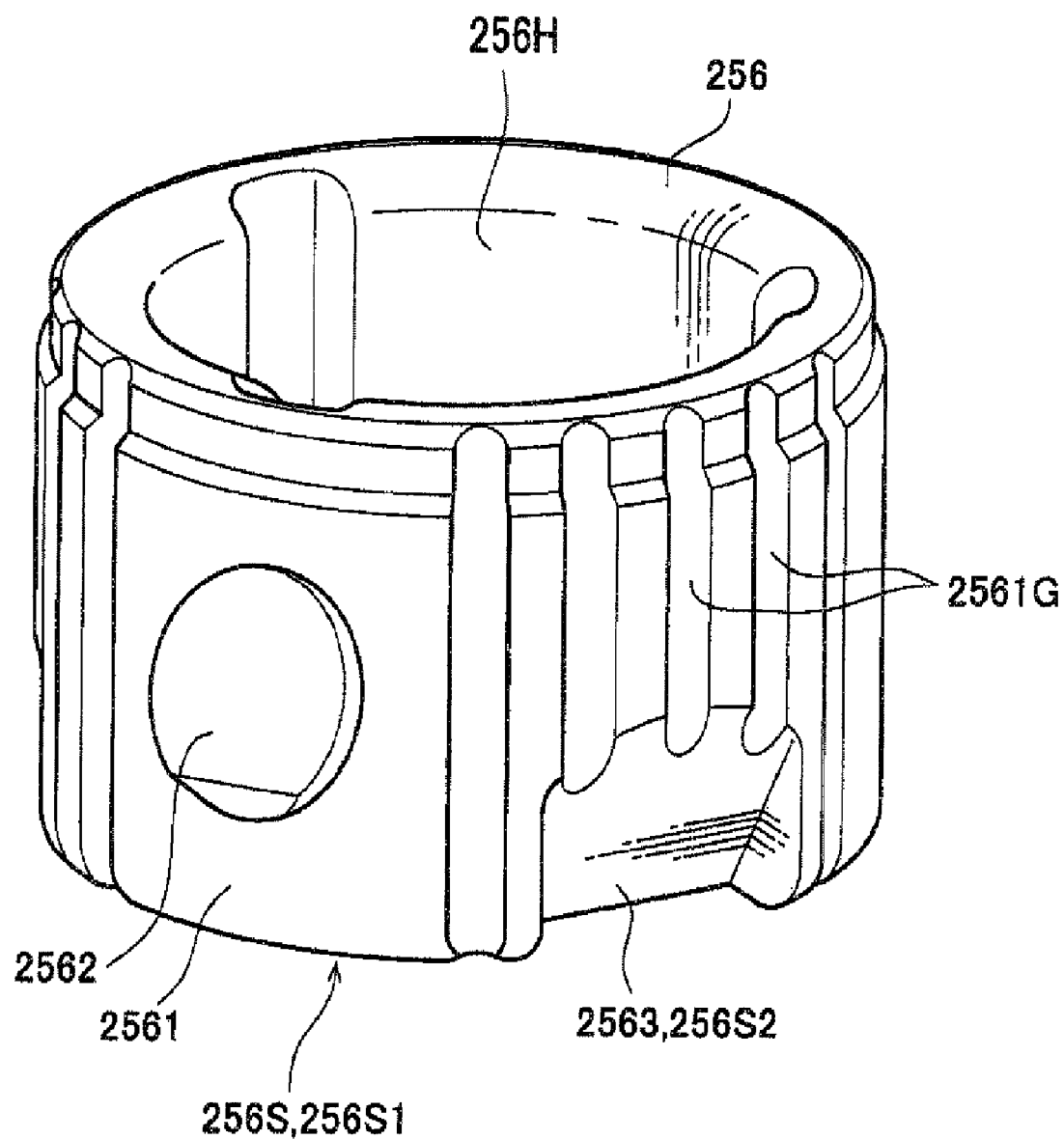
FIG. 18 is a perspective view of the rubber bushing used in the second embodiment.
Figure 19A:
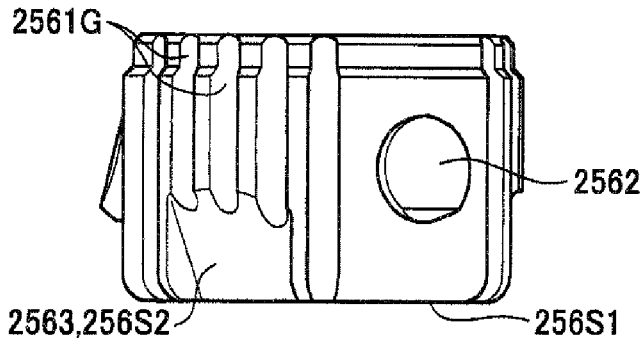
Figure 19B:
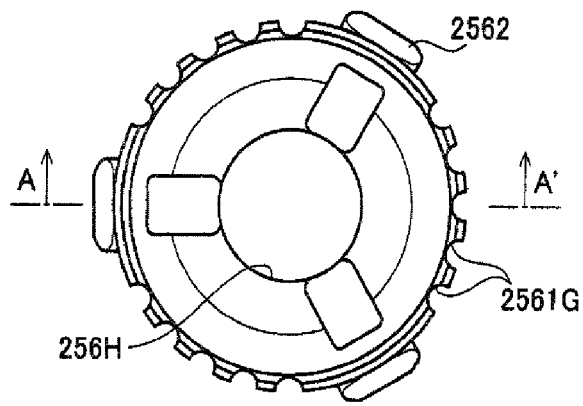
Figure 19C:
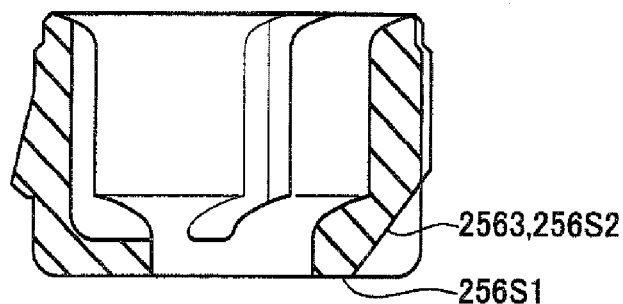
Figure 19D:
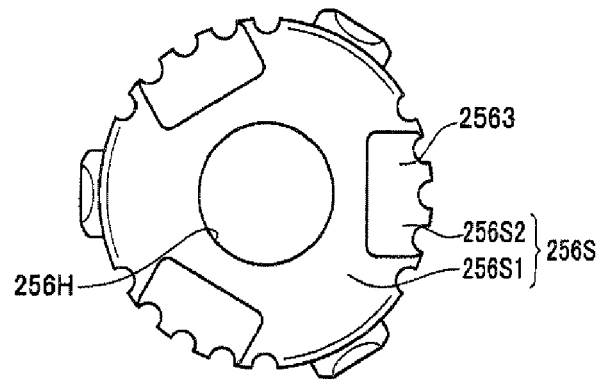

As shown in FIGS. 18 to 19B, the rubber bushing 256 has a hollow cylindrical bushing body portion 2561 which has the aforementioned holder holding hole 256H formed in its center and has an outside diameter allowing it to be fit to the outer cylinder 41. The rubber bushing 256 also has retaining projecting portions 2562 which are uniformly arranged at three positions on the outer periphery of bushing body portion 2561 and project radially outward from the bushing body portion 2561. The holder holding hole 256H of the bushing body portion 2561 is shaped so as to be brought into close contact with the holder member 255 and the protector 258 and so as to be capable of holding the holder member 244 and the protector 258.

This rubber bushing 256 is also held by the outer cylinder 41 as the retaining projecting portions 2562 are retained at the holding holes 41H in the outer cylinder 41. As such, the holder member 255 holding the concentration sensor element 51 and the protector 258 is held by the rubber bushing 256, and as this rubber bushing 256 is held by the outer cylinder 41, the entire liquid concentration sensor portion 2005 is held between the distal end portion 411 of the outer cylinder 41 and the distal end portion 421 of the inner cylinder 42.

As a result, the outer enclosed region FH is formed between the protector 258 and the distal end portion 411 of the outer cylinder 41.

Furthermore, in the same way as in the first embodiment, in the bushing body portion 2561, a multiplicity of outer peripheral slits 2561G extending in the axial direction (vertically in FIG. 18) are provided in the outer peripheral surface of the bushing body portion 2561 between adjacent ones of the retaining projecting portions 2562. These outer peripheral slits 2561G form circulation passages between the bushing body portion 2561 and the outer cylinder 41 so as to allow circulation of the urea aqueous solution NL and debubbling in the axial direction (vertically in the drawing), as shown in FIG. 15.

It should be noted, however, that in the rubber bushing 256 of the first embodiment, its distal end surface 56S is formed as a flat surface perpendicular to the axis AX. In contrast, the rubber bushing 256 of this second embodiment has notched portions 2563 which are arranged in a distal end portion of the bushing body portion 2561 at three positions in the circumferential direction and form distal inclined flat surfaces 256S2. For this reason, a distal end surface 256S of the rubber bushing 256 is constituted by the distal inclined flat surfaces 256S2 in addition to a distal end flat surface 256S1 perpendicular to the axis AX.

Figure 14:
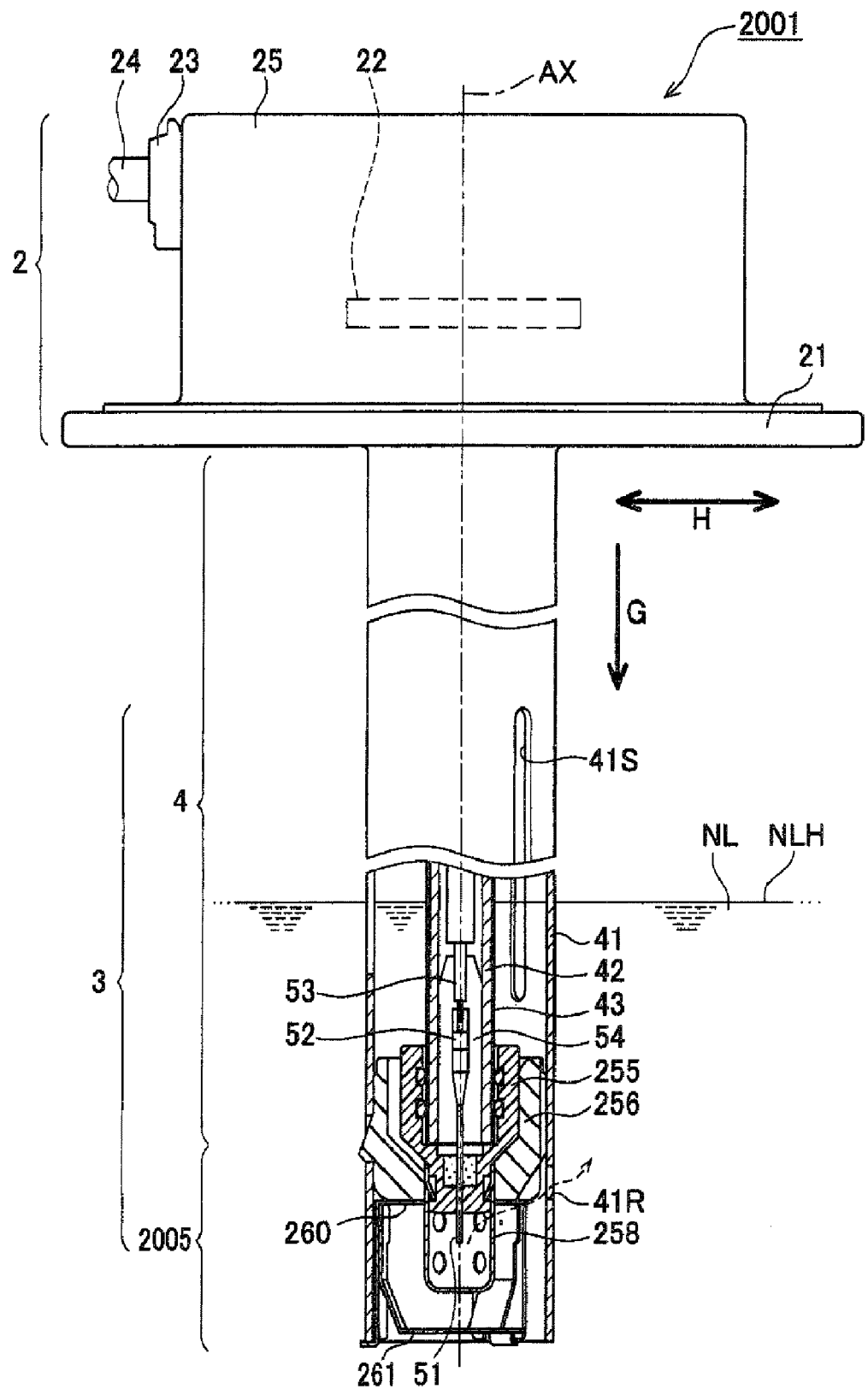
FIG. 14 is a fragmentary cross-sectional view of the liquid state detecting sensor in accordance with a second embodiment.
Figure 15:
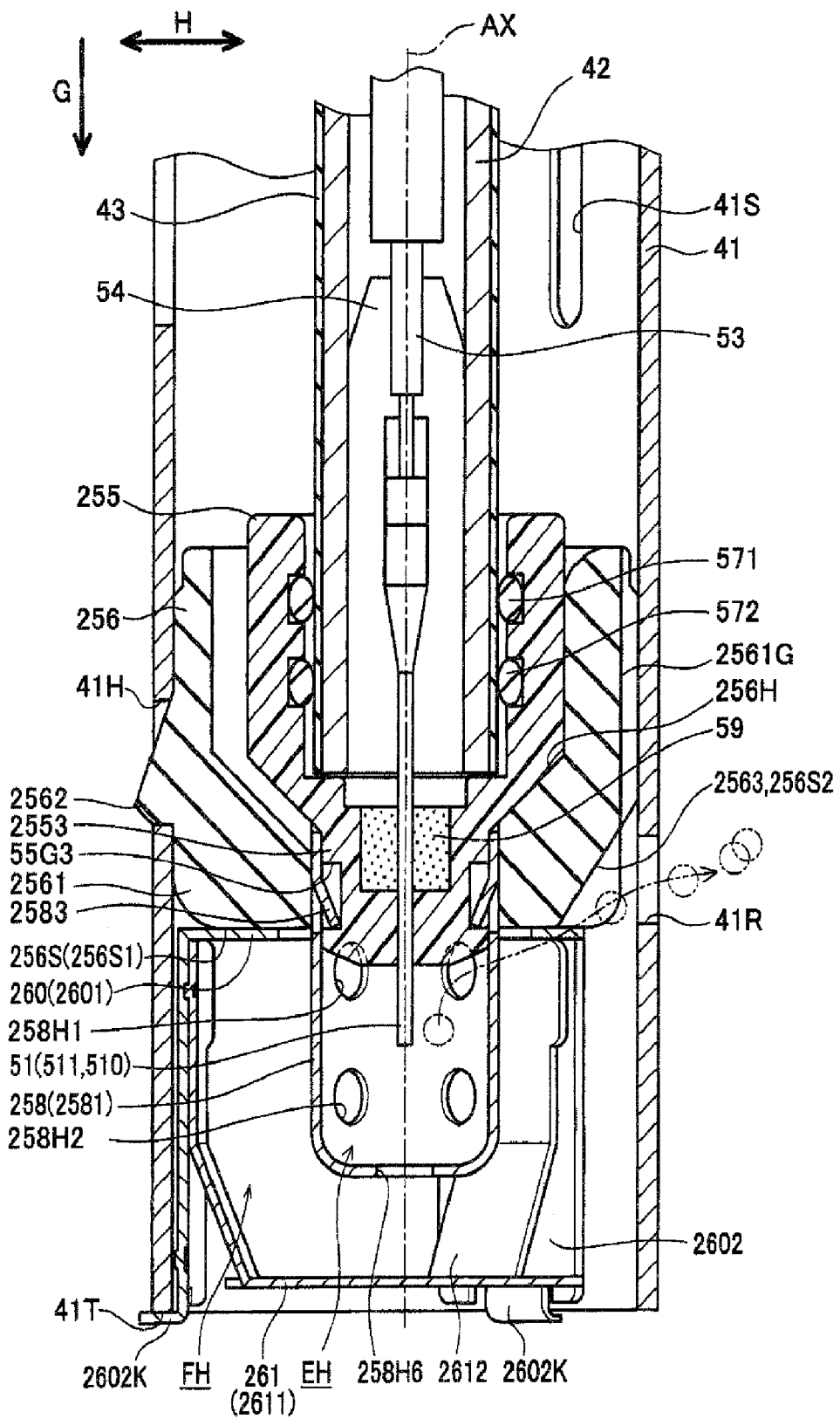
FIG. 15 is a longitudinal cross-sectional view of the liquid concentration sensor portion in the liquid state detecting sensor in accordance with the second embodiment.
Figure 20:
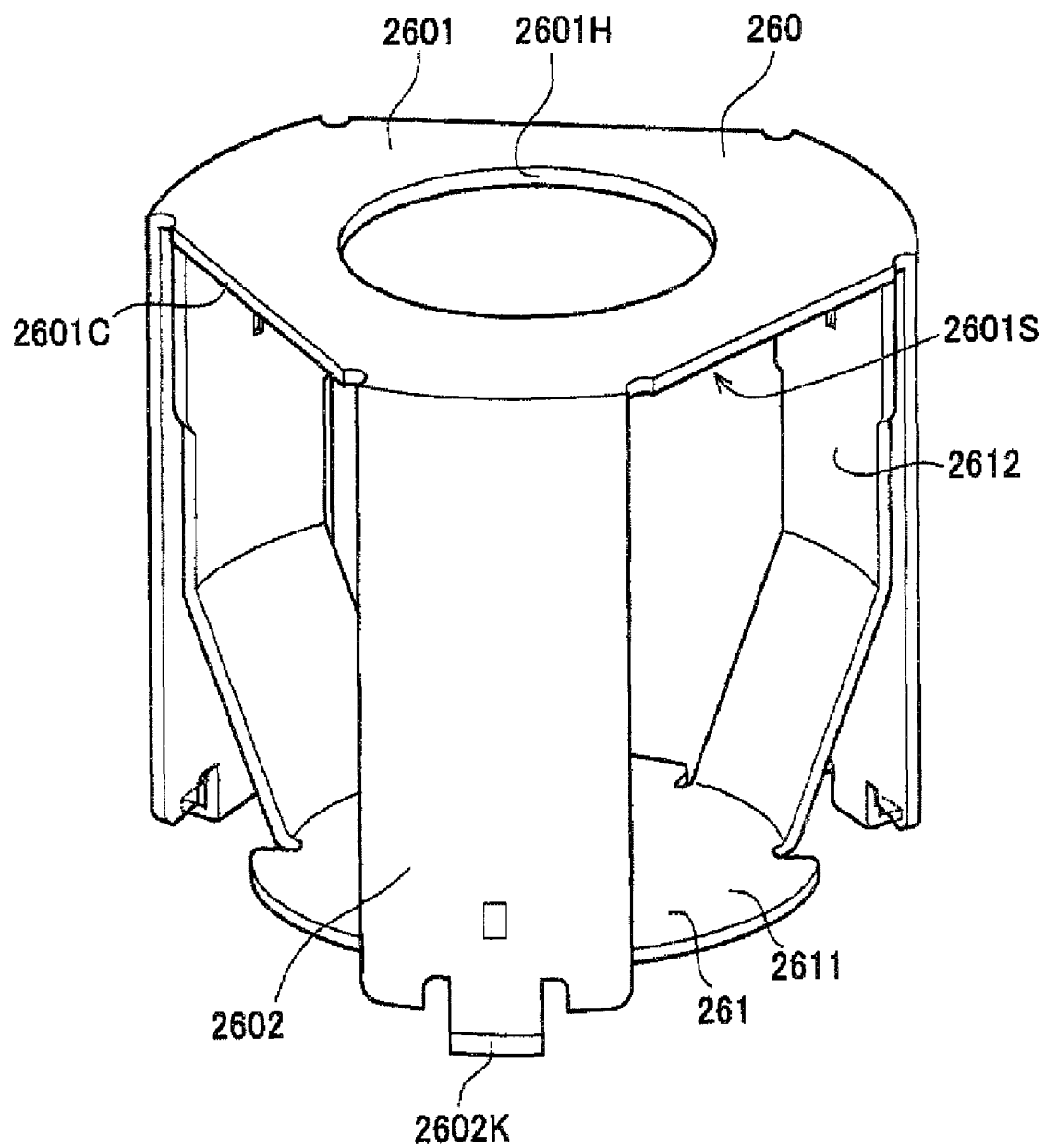
FIG. 20 is a perspective view of the positioning member and the rectifying member in a combined state, for use in the second embodiment.
Figure 21A:
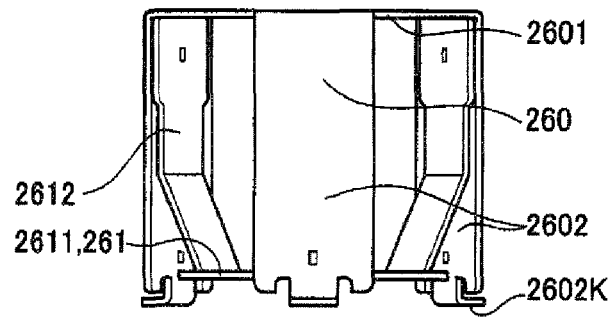
Figure 21B:
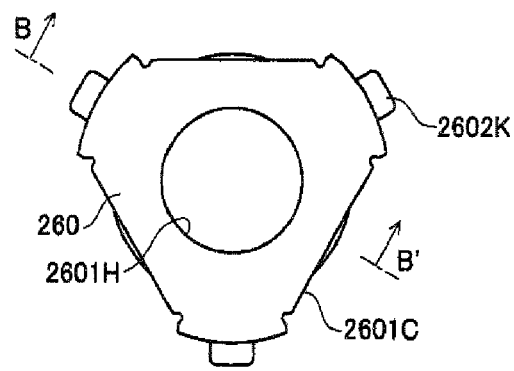
Figure 21C:
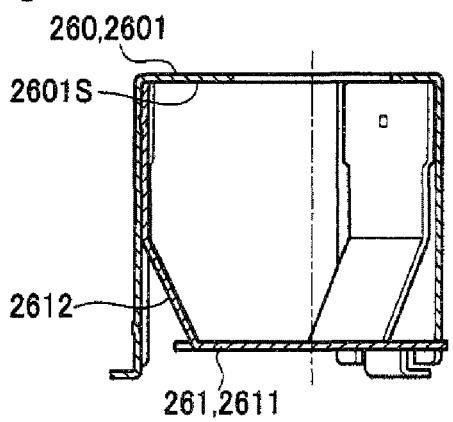
Figure 21D:
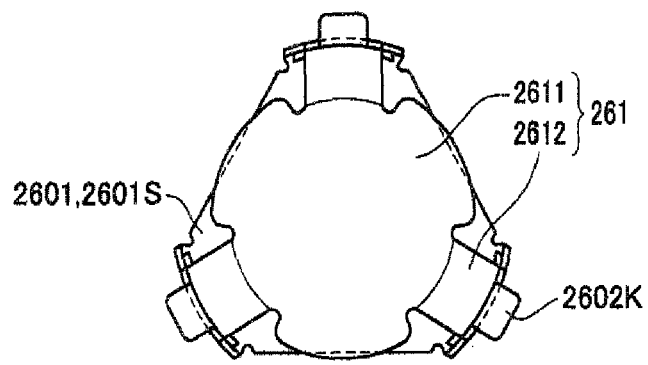

Furthermore, in the same way as in the first embodiment, a positioning member 260 and a rectifying member 261 shown in FIGS. 20 to 21D are fitted in the distal end portion 411 of the outer cylinder 41 on a side closer to the distal end side (lower side in the drawings) than the rubber bushing 256 (see FIGS. 14 and 15). However, the positioning member 260 and the rectifying member 261 are different in shape from the positioning member 60 and the rectifying member 61 of the first embodiment.

Namely, in the positioning member 60 of the first embodiment, the positioning plate portion 601 has an annular flat plate shape, and a form such that its outside diameter is substantially equal to the inside diameter of the outer cylinder 41. Also, the insertion hole 601H is provided in its center. In contrast, in the positioning member 260 of the second embodiment, the positioning plate portion 1601 has a flat plate shape, but has a form such that an outer periphery of an annular flat plate having an outside diameter substantially equal to the inside diameter of the outer cylinder 41 is linearly notched at three circumferential locations at intervals to form notched portions 2601C. The positioning plate portion 1601 is thereby formed into a substantially hexagonal shape in which a circular arc and a straight line alternately appear in the outer periphery. Further, an insertion hole 2601H is provided in its center. It should be noted that leg portions 2602 respectively extend from the three circular arc-shaped portions at the periphery of this positioning plate portion 2601 in a direction perpendicular thereto (direction of the axis AX). A leading end of each of these leg portions 2602 is bent radially outward and is thereby formed as an engaging pawl portion 2602K.

Further, the rectifying member 261 is fitted to the positioning member 260. This positioning member 260 consists of a substantially disk-shaped rectifying plate portion 2611 (see FIG. 21D) whose outside diameter is smaller than the inside diameter of the outer cylinder 41 and which has three bulging portions on three sides, as well as three leg portions 2612 extending diagonally toward the proximal end side (upward) from a peripheral edge of the rectifying plate portion 2611 and then extending toward the proximal end side (upward). These leg portions 2612 are respectively disposed on the inner sides of and along the leg portions 2602 of the positioning member 260, and the leg portions 2612 at their proximal end sides abut the positioning plate portions 2601 of the positioning member 260. In this state, the leg portions 2612 of the rectifying member 261 are welded (not shown) to the leg portions 2602 of the positioning member 260, to so as to be positioned in the direction along the axis AX (vertical direction in the drawing) and in the circumferential direction and to be formed integrally with one another.

Figure 16:
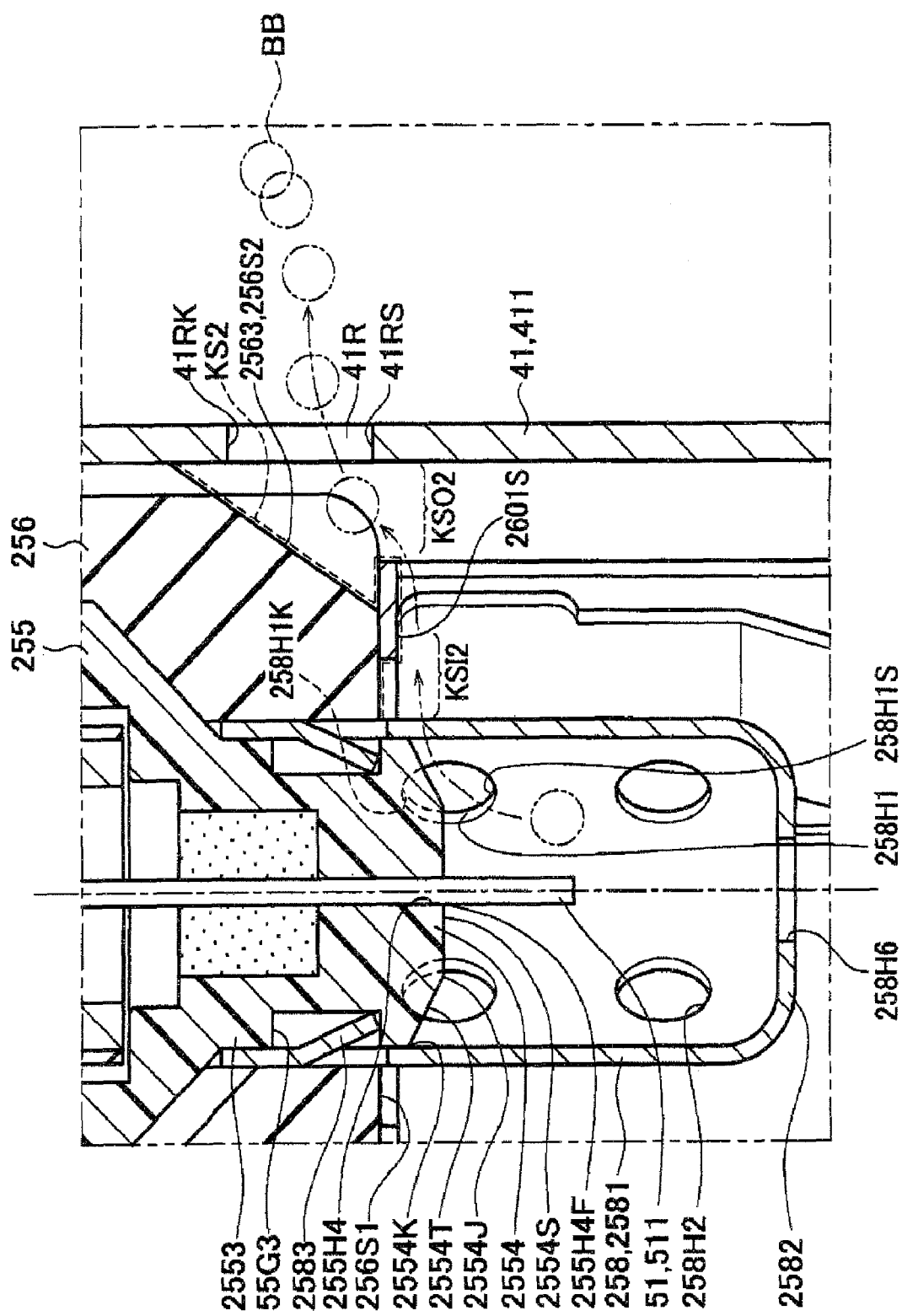
FIG. 16 is a partially enlarged explanatory diagram of the longitudinal cross-sectional view shown in FIG. 15, and illustrates the positional relationship among the protector, the outer cylinder, the rubber bushing, and the positioning member.

In the sensor 2001 in accordance with the second embodiment, as shown in FIGS. 15 and 16, the positioning member 260 and the rectifying member 261 are set in a state of being, substantially in their entireties, inserted in the outer cylinder 41. Then, the engaging pawl portions 2602K of the leg portions 2602 of the positioning member 260 are respectively engaged with the distal end 41T of the outer cylinder 41 to position the positioning member 260 and the rectifying member 261 in the direction along the axis AX. In this state, the leg portions 2602 of the positioning member 260 are welded to the outer cylinder 41 (not shown).

In conjunction therewith, the positioning plate portion 2601 is set in a state such that the protector 258 and the distal end portion 511 of the concentration sensor element 51 are inserted in the insertion hole 1601H, and the positioning plate portion 2601 abuts the flat distal end flat surface 256S1 located on the distal end side of the rubber bushing 256. The positioning of the rubber bushing 256 in the direction along the axis AX is also thereby performed.

The distal end flat surface 256S1 of the rubber bushing 256 and the positioning plate portion 2601 of the positioning member 260 are arranged such that the leg portions 2602 of the positioning member 260 are located on the distal end sides of the retaining projecting portions 2562 of the rubber bushing 256. For this reason, due to the fact that the notched portions 2601C are present in the positioning plate portion 2601, the notched portions 2563 of the rubber bushing 256 are exposed without being covered by the positioning plate portion 2601 (see FIGS. 16 and 17). Apart from a distal end surface 2601S which is the lower surface of the positioning plate portion 2601 of the positioning member 260, portions of the distal end flat surface 256S1 and the distal inclined flat surfaces 256S2 constituting the notched portions 2563 at the distal end surface 256S of the rubber bushing 256 face the outer enclosed region FH.

In addition, in the same way as in the first embodiment, the rectifying plate portion 2611 of the rectifying member 261 is set to close a portion (central portion) of the opening at the distal end portion 411 of the outer cylinder 41. As a result, it is possible to appropriately suppress a defect in which the output of the concentration sensor element 51 fluctuates due to a liquid current produced in the urea aqueous solution NL.

Furthermore, in the same way as in the first embodiment, also in the sensor 2001 in accordance with this second embodiment, as shown in FIGS. 15 and 16, the liquid circulation holes 258H1 and 258H2 provided in the side portion 2581 of the protector 258 and the tapered distal end portion 2554 of the holder member 255 for holding the concentration sensor element 51 are set in the following relationship.

As described above, the surface of the tapered distal end portion 2554 is made up of the flat distal end surface 2554S perpendicular to the axis AX and the tapered outer peripheral surface 2554T whose diameter gradually enlarges toward the proximal end side (upper side in the drawings). Furthermore, the four upper liquid circulation holes 258H1 are arranged such that their proximal ends 258H1K located at the highest positions in the rims of the upper liquid circulation holes 258H1 are located higher than a proximal edge 2554K of the outer peripheral surface 2554T. Additionally, the upper liquid circulation holes 258H1 are also arranged such that their distal ends 258H1S located at the lowest positions in the rims of the upper liquid circulation holes 258H1 are located lower than the proximal edge 2554K of the outer peripheral surface 2554T.

By providing the above-described arrangement, in the same way as in the first embodiment, even in cases where bubbles have entered the interior of the enclosed region EH, the bubbles BB rise upward along the tapered outer peripheral surface 2554T and move radially outward without stagnating around the distal end portion 511 of the concentration sensor element 51. In addition, it is difficult for bubbles which have moved radially outward to return to a surrounding region of the distal end portion 511 on the radially inward side. Further, as for the upper liquid circulation holes 258H1, their proximal ends (upper ends) 258H1K are located higher than the proximal edge 2554K, and their distal ends (lower ends) 258H1S are located lower than the proximal edge 2554K. Therefore, the bubbles in the vicinity of this proximal edge 2554K can be easily discharged outside the protector 258 through the respective upper liquid circulation holes 258H1. In other words, the upper liquid circulation holes 258H1 serve not only as holes for the circulation of the urea aqueous solution NL but also as bubble-discharging holes for appropriately discharging the bubbles which have entered the interior of the enclosed region EH.

In this second embodiment as well, since the distal end surface 2554S of the holder member 255 is formed as a flat surface perpendicular to the axis AX, every portion of a hole rim 255H4F of the element holding hole 255H4 is at the same height. Accordingly, every portion of the hole rim 255H4F is formed as a lowest hole periphery of the hole 255H4F.

In addition, in the holder member 255, its distal end surface 2554S is formed as a flat surface of the same height, while its outer peripheral surface 2554T is formed as a tapered surface located higher than the same. In other words, in either portion of the distal end surface 2554S and the outer peripheral surface 2554T facing the enclosed region EH, when a comparison is made of the respective portions, a portion on a side closer to the proximal edge (surface peripheral edge) 2554K is formed so as to be located higher or at the same height. Specifically, the distal end surface 2554S even at a position close to the proximal edge (surface peripheral edge) 2554K is located at the same height as the hole rim 255H4F of the element holding hole 255H4. In addition, as for the outer peripheral surface 2554T, the closer to the proximal edge (surface peripheral edge) 2554K, the higher its position.

Moreover, as described above, as for the upper liquid circulation holes (bubble-discharging holes) 258H1, their proximal ends (upper ends) 258H1K are located higher than the proximal edge (surface peripheral edge) 2554K of the outer peripheral surface 2554T, and their distal ends (lower ends) 258H1S are located lower than the proximal edge (surface peripheral edge) 2554K of the outer peripheral surface 2554T.

Since the distal end surface 2554S and the outer peripheral surface 2554T of the holder member 255 are thus set, in this second embodiment as well, the bubbles which have reached the distal end surface 2554S or the outer peripheral surface 2554T can be moved radially outward along these surfaces and can be easily discharged outside the protector 258 through the upper liquid circulation holes 258H1.

Furthermore, the holder member 255 has its lower end surface (the distal end surface 2554S and the outer peripheral surface 2554T) formed by the distal end surface 2554S around the element holding hole 255H4 and by the outer peripheral surface 2554T which is located on the surface peripheral edge side (proximal edge side) of the lower end surface, the outer peripheral surface 2554T including the proximal surface edge 2554K, i.e., the surface peripheral edge of this lower end surface, and being higher than the distal end surface 2554S.

By providing the above-described arrangement, the outer peripheral surface 2554T is located higher than the distal end surface 2554S to form a "pocket." Once the bubbles BB have moved to the outer peripheral surface 2554T side, it is difficult for the bubbles BB to return to the distal end surface 2554S side. Accordingly, the bubbles BB which have entered the enclosed region EH can be reliably moved toward the proximal surface edge 2554K. Moreover, in terms of the relationship with the upper liquid circulation holes (bubble-discharging holes) 258H1 as well, the bubbles BB can be discharged more appropriately since the above-described arrangement is provided.

It should be noted that the distal end surface 2554S and the outer peripheral surface 2554T in this second embodiment also correspond to the lower end surface in the invention. In addition, the distal end surface 2554S corresponds to the element surrounding surface, and the outer peripheral surface 2554T to the peripheral side surface.

Referring to FIGS. 15 and 16, a description will be given of the relationships among the upper liquid circulation holes 258H1 of the protector 258, the circulation holes 41R of the outer cylinder 41, the distal end surface 256S of the rubber bushing 256, and the distal end surface 2601S of the positioning plate portion 2601 of the positioning member 260 in the sensor 2001 in accordance with the second embodiment. It should be noted that the upper liquid circulation holes 258H1 of the protector 258 correspond to the circulation holes and the bubble-discharging holes of the enclosing member. In addition, the circulation holes 41R of the outer cylinder 41 correspond to the outer circulation holes and the outer bubble-discharging holes of the outer enclosing member. Further, the distal end surface 256S of the rubber bushing 256 and the distal end surface 2601S of the positioning plate portion 2601 of the positioning member 260 correspond to the interposed member lower surface of the interposed member.

In the same way as in the first embodiment, in the sensor 2001 as well, the distal end portion 411 of the hollow cylindrical outer cylinder 41 encloses the periphery in the horizontal direction H of the distal end portion 511 of the concentration sensor element 51 and the periphery in the horizontal direction H of the protector 258 to leave an interval with respect to the protector 258. Accordingly, the outer enclosed region FH is formed between the distal end portion 411 of this outer cylinder 41 and the protector 258.

The three circulation holes 41R allowing the urea aqueous solution NL to circulate between the outer enclosed region FH and the outside in the horizontal direction H of the distal end portion 411 of the outer cylinder 41 are bored in a distal end portion 411 of the outer cylinder 41 at equal intervals in the circumferential direction. The circulation holes 41R respectively have the same shape and are arranged at the same position as viewed in the direction of the axis AX (gravitational direction G). The circulation holes 41R not only allow the urea aqueous solution NL to circulate therethrough, but have their proximal ends 41RK (upper ends) located higher than the proximal ends 258H1K (upper ends) of the upper liquid circulation holes 258H1 (bubble-discharging holes), as can be appreciated from FIGS. 15 and 16.

Further, the rubber bushing 256 and the positioning member 260 are interposed between the protector 258 and the distal end portion 411 of the outer cylinder 41. The rubber bushing 256 and the positioning plate portion 2601 of the positioning member 260 are located on the proximal end side (upper side in the drawings) of the outer enclosed region FH. Accordingly, as described above, apart from the distal end surface 2601S which is the lower surface of the positioning plate portion 2601 of the positioning member 260, portions of the distal end flat surface 256S1 and the distal inclined flat surfaces 256S2 constituting the notched portions 2563 at the distal end surface 256S of the rubber bushing 256 face the outer enclosed region FH. In other words, as for the rubber bushing 256 and the positioning plate portion 2601 of the positioning member 260, which correspond to the interposed members, portions of the distal end surface 25S and the distal end surface 2601S constitute an interposed member lower surface KS2 indicated by the broken line along them in FIG. 16.

Figure 17:
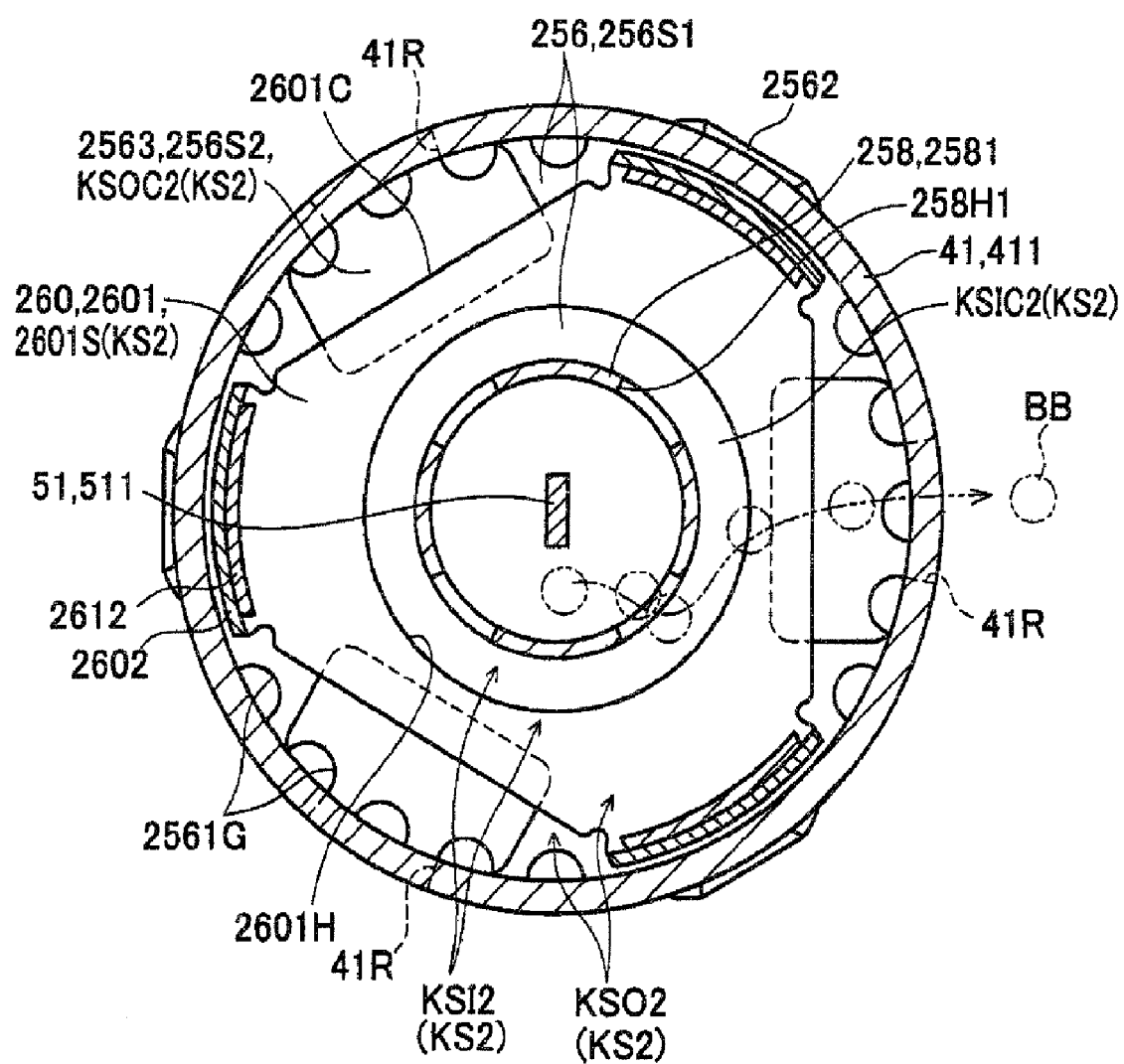
FIG. 17 is a transverse cross-sectional view, as taken from the distal end side, illustrating the positional relationship among the protector, the outer cylinder, the rubber bushing, and the positioning member in the liquid state detecting sensor in accordance with the second embodiment.

However, unlike the first embodiment, the interposed member lower surface KS2 in this second embodiment includes the distal inclined flat surfaces 256S2 constituting the notched portions 2563 at the distal end surface 256S of the rubber bushing 256, in addition to the distal end surface 2601S (lower surface) of the positioning plate portion 2601 having a horizontal surface substantially in its entirety. FIG. 17 shows a transverse cross-sectional view, as taken from the distal end side, of the interposed member lower surface KS2, the protector 258, and the like.

Here, in this interposed member lower surface KS2, the annular portion located on the protector 258 side (inner side) is set as an inner peripheral portion KSI2, and in this portion, portions (four locations) located outside in the horizontal direction H (the direction long the plane of the drawing) of the upper liquid circulation holes 258H1 of the protector 258 are set as discharge-hole corresponding portions KSIC2.

Then, in this second embodiment as well, it can be appreciated that, in the inner peripheral portion KSI2 of the interposed member lower surface KS2, the discharge-hole corresponding portions KSIC2 are respectively set higher than the proximal ends 258H1K (upper ends) of the corresponding upper liquid circulation holes 258H1. The bubbles BB which have entered the interior of the enclosed region EH (protector 258) are discharged outside the protector 258 through the upper liquid circulation holes 258H1. At this juncture, since the discharge-hole corresponding portions KSIC2 are respectively set higher than the proximal ends 258H1K (upper ends) of the corresponding upper liquid circulation holes 258H1, the bubbles BB can be reliably discharged outside the outer enclosed region FH through the upper liquid circulation holes 258H1.

Meanwhile, in the interposed member lower surface KS2, the annular portion located on the outer cylinder 41 side (outer side) is set as an outer peripheral portion KSO2. In this portion, portions (three locations) located inside in the horizontal direction H (left-right direction in the drawing) of the circulation holes 41R of the outer cylinder 41 are set as outer-discharge-hole corresponding portions KSOC2. As described above, in the second embodiment, the three notched portions 2601C are provided in the positioning plate portion 2601, and the three notched portions 2563 are provided in the rubber bushing 256. More specifically, the distal inclined flat surfaces 256S2 respectively formed at the notched portions 2563 of the rubber bushing 256 correspond to the outer-discharge-hole corresponding portions KSIC2.

As shown in FIGS. 16 and 17, the outer-discharge-hole corresponding portions KSOC2 (distal inclined flat surfaces 256S2 of the notched portions 2563) are respectively set higher than the distal ends 41RS of the corresponding circulation holes 41R. Accordingly, in cases where the bubbles BB are located in the vicinity of these outer-discharge-hole corresponding portions KSOC2, the bubbles BB can be discharged outside the outer cylinder 41 through the respective circulation holes 41R.

Moreover, in the second embodiment, in the outer peripheral portion KSO2 of the interposed member lower surface KS2, the outer-discharge-hole corresponding portions KSOC2 (distal inclined flat surfaces 256S2) are located higher (on the farther side in the plane of FIG. 17) than other portions such as the distal end surface 2601S of the positioning plate portion 2601, including the inner peripheral portion KSI2.

The outer-discharge-hole corresponding portions KSOC2 (distal inclined flat surfaces 256S2) are thus located higher than the distal end surface 2601S of the positioning plate portion 2601 to thereby form "pockets." As a result, once the bubbles BB have moved to the vicinity of the distal inclined flat surfaces 256S2, it is difficult for the bubbles BB to return to the inner peripheral portion KSI2 lower than the same, and further to the interior of the protector 258. Namely, the bubbles (bubble groups) BB which entered the enclosed region EH, which were discharged through the upper liquid circulation holes 258H1, and which entered the interior of the outer enclosed region FH can be reliably moved toward the outer-discharge-hole corresponding portions KSOC2 (distal inclined flat surfaces 256S2).

As such, since the bubbles BB in the vicinity of the outer-discharge-hole corresponding portions KSOC2 can be further reliably discharged outside the outer cylinder 41 through the circulation holes 41R, the effect of bubbles on such as the concentration detection can be suppressed reliably.

In cases where the liquid currents and vibrations are small, the bubbles move from the discharge-hole corresponding portions KSIC2 to the outer-discharge-hole corresponding portions KSOC2 along the interposed member lower surface KS2. As is apparent from FIG. 16 as well, all portions of this interposed member lower surface KS2 are set higher than the proximal ends 258H1K (upper ends) of the upper liquid circulation holes 258H1. Accordingly, the bubbles (bubble groups) which have once been discharged to the outer enclosed region FH through the upper liquid circulation holes 258H1 are prevented from flowing backward into the enclosed region EH (into the protector 258).

Next, as for the operation of the liquid concentration sensor portion 2005 of the sensor 2001 in the detection of the concentration of the urea aqueous solution NL, since it is similar to that of the sensor 1 in accordance with the first embodiment, a description thereof will be omitted.

Although the present invention has been described above in the context of the first and second embodiments and the modification, the present invention is not limited to the above-described embodiments and the like, and it goes without saying that the present invention may be implemented with various modifications, as required, without departing from the scope of the invention.

For example, in the above-described first and second embodiments and the like, the sensor of the type in which the liquid level sensor portion 4 and the liquid concentration sensor portion 5 or 2005 are combined has been illustrated by way of example as the liquid state detecting sensor 1, 1001, or 2001. However, the invention is also applicable to a type which does not have the function of a liquid level sensor and to a type which does not have an outer cylinder. In addition, although in the above-described first embodiment a description has been given of a technique of detecting the concentration of the urea aqueous solution NL in the liquid concentration sensor portion 5, it is also possible to measure the liquid temperature of the urea aqueous solution NL from a resistance value immediately after energizing the concentration sensor element 51 (internal heater wiring 518). Accordingly, the liquid state detecting sensor in accordance with the invention can also be used as a liquid temperature sensor for measuring a liquid temperature, in addition to the concentration of the urea aqueous solution NL.

In addition, although in the above-described first embodiment and the like the sensor having the wiring board 22 with the control circuit mounted thereon has been illustrated by way of example as the liquid state detecting sensor 1. However, the liquid state detecting sensor in accordance with the invention is sufficient if it is provided with the liquid concentration detecting element, the holder member for holding the same, the enclosing member, and the like, and the liquid state detecting sensor in accordance with the invention includes a liquid state detecting sensor of a type which does not include the control circuit.

In the above-described first embodiment, in the respective liquid circulation holes 58H1 to 58H4 formed in the side portion 481 of the protector 58, their proximal ends (upper ends) 58H1K and the like are disposed so as to be higher than the distal end surface 554S of the holder 55, and their distal ends (lower ends) 58H1S and the like are disposed so as to be lower than the proximal edge 554K.

Further, in the respective liquid circulation holes 58H1 to 58H4, their proximal ends (upper ends) 58H1K and the like are disposed so as to be higher than the proximal edge 554K of the outer peripheral surface 554T of the holder 55, and their distal ends (lower ends) 58H1S and the like are similarly disposed so as to be lower than the proximal edge 554K. The same applies to the second embodiment as well.

However, it is sufficient if any one of the liquid circulation holes satisfies the above-described relationship. Nonetheless, the greater the number of liquid circulation holes (bubble-discharging holes) which satisfy the above-described relationship, the more appropriately the bubbles can be discharged.

In addition, in the above-described first embodiment, in addition to the distal end surface 554S, the tapered outer peripheral surface 554T is provided around the element holding hole 55H4 of the holder member 55, and a "pocket" in the shape of a triangular cross section is thereby provided around the distal end surface 554S. However, it is possible to adopt a form in which the distal end surface 554S is provided with, instead of the tapered outer peripheral surface 554T, a step-like outer peripheral surface located on the proximal end side (upper side in the drawing) so as to be provided with a "pocket" in the shape of a rectangular cross section.

In the above-described first embodiment, the discharge-hole corresponding portions KSIC corresponding to the liquid circulation holes 58H1 and the like formed in the protector 58 are respectively set higher than the proximal ends 58H1K and the like (upper ends) of the corresponding liquid circulation holes 58H1 and the like (bubble-discharging holes).

Further, the outer-discharge-hole corresponding portions KSOC corresponding to the circulation holes 41R formed in the outer cylinder 41 are respectively set higher than the proximal ends 41RK (upper ends) of the corresponding circulation holes 41R (outer bubble-discharging holes). The same applies to the second embodiment as well.

However, it is sufficient if at least one of the bubble-discharging holes and the outer bubble-discharging holes satisfies the above-described relationship. However, as the number of bubble-discharging holes and outer bubble-discharging holes which satisfy the above-described relationship is increased, the bubbles can more effectively be discharged.

It should further be apparent to those skilled in the art that various changes in form and detail of the invention as shown and described above may be made. It is intended that such changes be included within the spirit and scope of the claims appended hereto.

This application is based on Japanese Patent Application JP 2006-217325, filed Aug. 9, 2006, the entire content of which is hereby incorporated by reference, the same as if set forth at length.

What is claimed is:

1. A liquid state detecting sensor for detecting a state of a liquid, comprising:
    a liquid concentration detecting element for detecting a concentration of a particular component of the liquid;
    a holder member holding the liquid concentration detecting element in a state in which a distal end portion of the liquid concentration detecting element protrudes from an element holding hole and having a lower end face which is configured so as to guide bubbles in the inner enclosing member to the inner bubble-discharging hole;
    an inner enclosing member radially enclosing at least a periphery of the distal end portion of the liquid concentration detecting element to leave an interval with the distal end portion and including an inner bubble-discharging hole;
    an outer enclosing member radially enclosing a periphery of the inner enclosing member to leave an interval with the inner enclosing member and having an outer bubble-discharging hole which has an upper end located higher than an upper end of the inner bubble-discharging hole; and
    an interposed member interposed between the inner enclosing member and the outer enclosing member and including an interposed member lower surface which is configured so as to guide bubbles discharged from the bubble-discharging holes to the outer bubble-discharging hole.

2. The liquid state detecting sensor as claimed in claim 1, wherein the liquid concentration detecting element comprises a flat-plate ceramic substrate and an internal wiring disposed in the ceramic substrate, the internal wiring comprising a temperature rise detecting portion which undergoes a temperature rise upon energization and which is provided in a part of a distal end portion of the liquid concentration detecting element, and a surface of the ceramic substrate being exposed to the liquid;

the element holding hole has a hole rim at a lower end of the holder member;

when the liquid state detecting sensor is set such that a protruding direction of the distal end portion of the liquid concentration detecting element coincides with a gravitational direction, the inner enclosing member encloses at least a periphery in a horizontal direction of the distal end portion of the liquid concentration detecting element to leave an interval with the distal end portion, at least one of circulation holes being formed in the enclosing member so as to allow the liquid to circulate in and out of an enclosed region enclosed by the inner enclosing member, the holder member is configured such that respective portions of a lower end surface facing the enclosed region are located higher than or at a same height as a lowest hole periphery from which the detecting element protrudes, and at least one of the circulation holes is a bubble-discharging hole which has an upper end located higher than the lowest hole periphery at the rim of the element holding hole from which the detecting element protrudes and a lower end located lower than a surface peripheral edge of the lower end surface.

3. The liquid state detecting sensor as claimed in claim 2, wherein, the holder member is configured such that, in respective portions of the lower end surface, when a comparison is made of the respective portions, a portion on a side closer to a surface peripheral edge of the lower end surface is located higher or at the same height, and an upper end of the circulation hole is located higher than the surface peripheral edge of the lower end surface.

4. The liquid state detecting sensor as claimed in claim 3, wherein the lower end surface of the holder member is formed by an element surrounding surface around the element holding hole and by a peripheral side surface which is located on a side closer to the surface peripheral edge of the lower end surface than the element surrounding surface, the surface peripheral edge of the lower end surface being higher than the element surrounding surface.

5. The liquid state detecting sensor as claimed in claim 2, wherein, the holder member is configured such that the lower end surface becomes gradually higher from the hole rim of the element holding hole toward the surface peripheral edge of the lower end surface.

6. The liquid state detecting sensor as claimed in claim 2, wherein the distal end portion of the liquid concentration detecting element includes:
a main surface; and
a reverse surface located on a reverse side of the main surface, the distal end portion including a temperature rise detecting portion which increases in temperature upon energization, wherein the inner enclosing member is configured such that the circulation holes including the bubble-discharging holes are individually arranged so as not to frontally face a temperature-rise-portion main surface or a temperature-rise-portion reverse surface of the distal end portion of the liquid concentration detecting element, in which the temperature-rise-portion main surface is a portion of the main surface included in the temperature rise detecting portion, and the temperature-rise-portion reverse surface is a portion of the reverse surface included in the temperature rise detecting portion.

7. The liquid state detecting sensor as claimed in claim 1, wherein the outer enclosing member has at least one of outer circulation holes so as to allow the urea aqueous solution to circulate, in the horizontal direction, between a region outside the outer enclosing member and an outer enclosed region defined by the outer enclosing member and the inner enclosing member, the interposed member includes an interposed member lower surface located higher than the outer enclosed region and facing the outer enclosed region, at least one of the outer circulation holes is a outer bubble-discharging hole which has an upper end located higher than the upper end of the bubble-discharging hole, and the interposed member lower surface is configured such that, in an inner peripheral portion of the interposed member lower surface, at least each of discharge-hole corresponding portions located outwardly of the bubble-discharging holes in the horizontal direction is set higher than the upper end of a corresponding one of the bubble-discharging holes, while, in an outer peripheral portion of the interposed member lower surface, at least each of outer-discharge-hole corresponding portions located inwardly of the outer bubble-discharging hole in the horizontal direction is set higher than a lower end of a corresponding one of the outer bubble-discharging holes, and is configured such that at least a portion of bubble groups which have entered an interior of the enclosed region and have been discharged through the bubble-discharging holes is capable of moving from the discharge-hole corresponding portion to the outer-discharge-hole corresponding portion along the portion of the interposed member lower surface which is higher than the upper end of the bubble-discharging hole corresponding to the discharge-hole corresponding portion.

8. The liquid state detecting sensor as claimed in claim 7, wherein respective portions of the interposed member lower surface of the interposed member are set higher than the upper ends of the bubble-discharging holes.

9. The liquid state detecting sensor as claimed in claim 7, wherein, in the interposed member lower surface of the interposed member, at least the outer-discharge-hole corresponding portions of an outer peripheral portion of the interposed member lower surface are respectively set higher than the inner peripheral portion.

* * * * *